March 27, 1956  W. R. GRISWOLD ET AL  2,739,431
REAM WRAPPING MACHINE
Filed Nov. 6, 1952  22 Sheets-Sheet 2

Inventors
WALTER R. GRISWOLD
BIAGIO J. NIGRELLI

Fig. 4

March 27, 1956 W. R. GRISWOLD ET AL 2,739,431
REAM WRAPPING MACHINE
Filed Nov. 6, 1952 22 Sheets-Sheet 5

INVENTORS:
WALTER R. GRISWOLD
BIAGIO J. NIGRELLI
By
Att'ys

March 27, 1956 — W. R. GRISWOLD ET AL — 2,739,431
REAM WRAPPING MACHINE
Filed Nov. 6, 1952 — 22 Sheets-Sheet 6
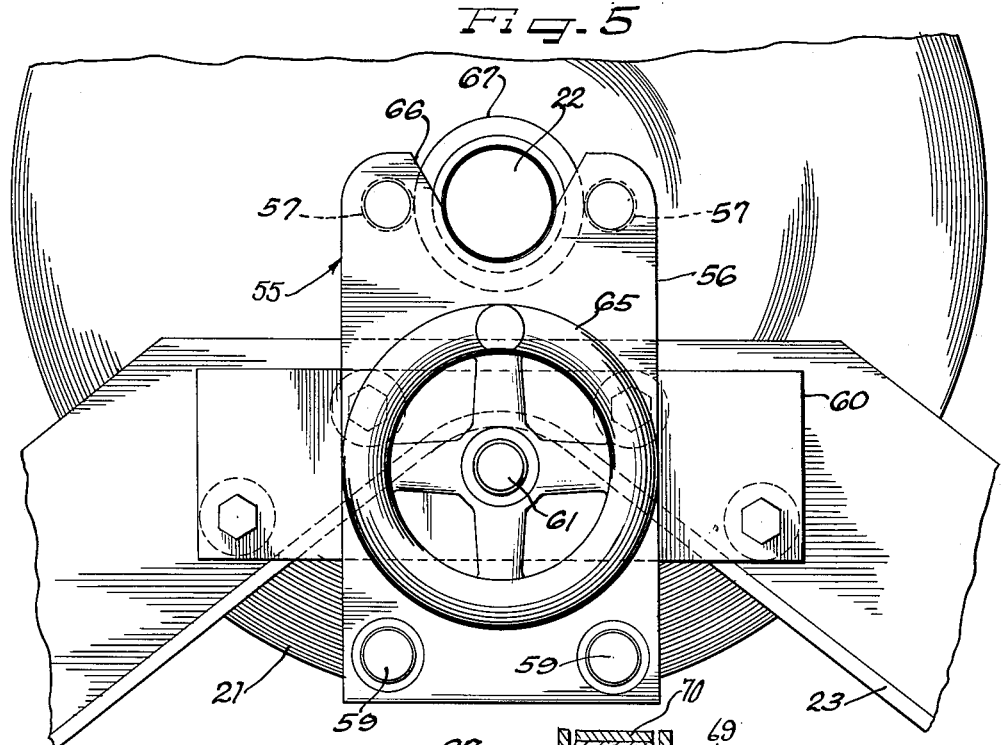
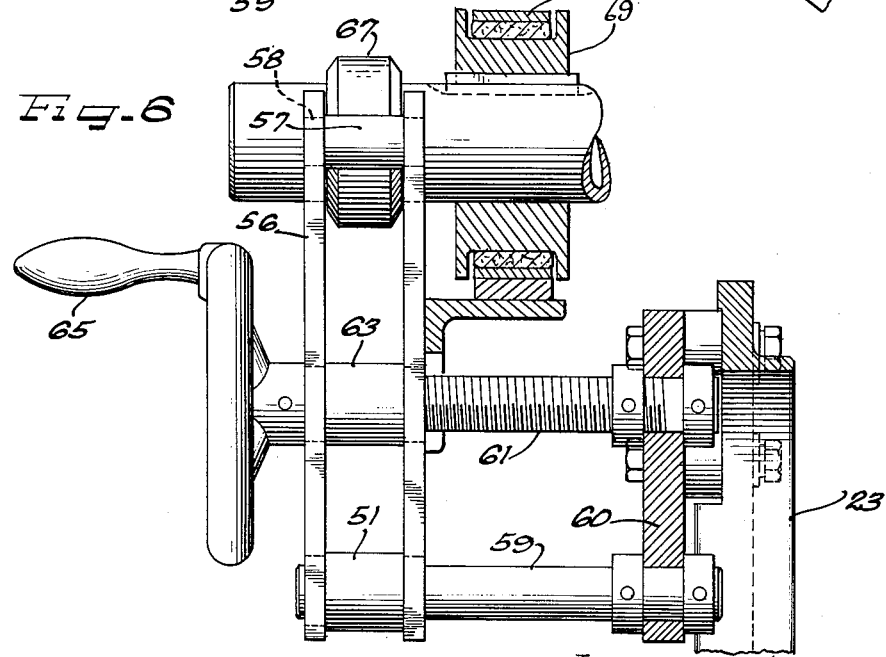
Inventors
WALTER R. GRISWOLD
BIAGIO J. NIGRELLI March 27, 1956  W. R. GRISWOLD ET AL  2,739,431
REAM WRAPPING MACHINE
Filed Nov. 6, 1952  22 Sheets-Sheet 7

Inventors
WALTER R. GRISWOLD
BIAGIO J. NIGRELLI
Attys.

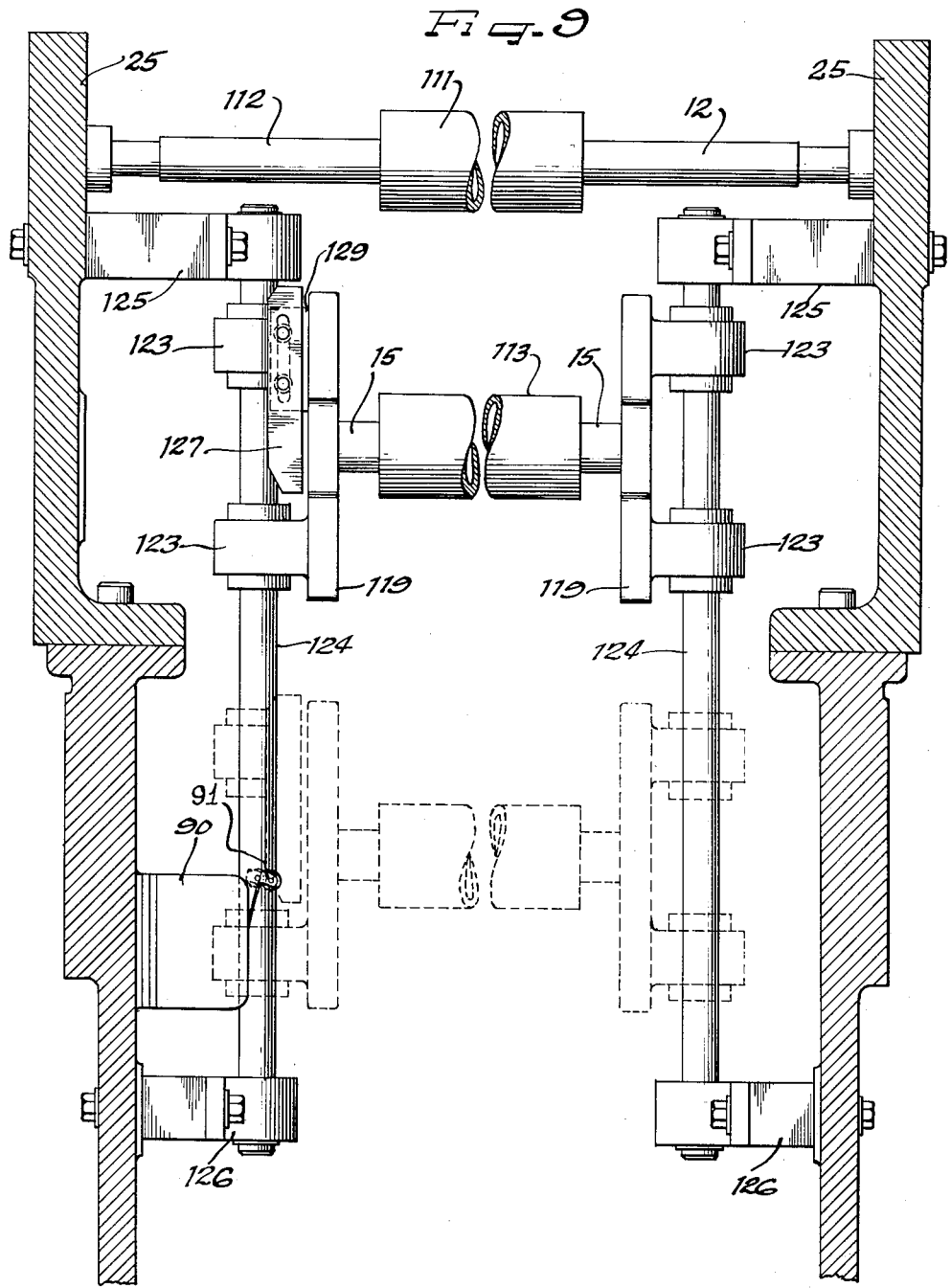

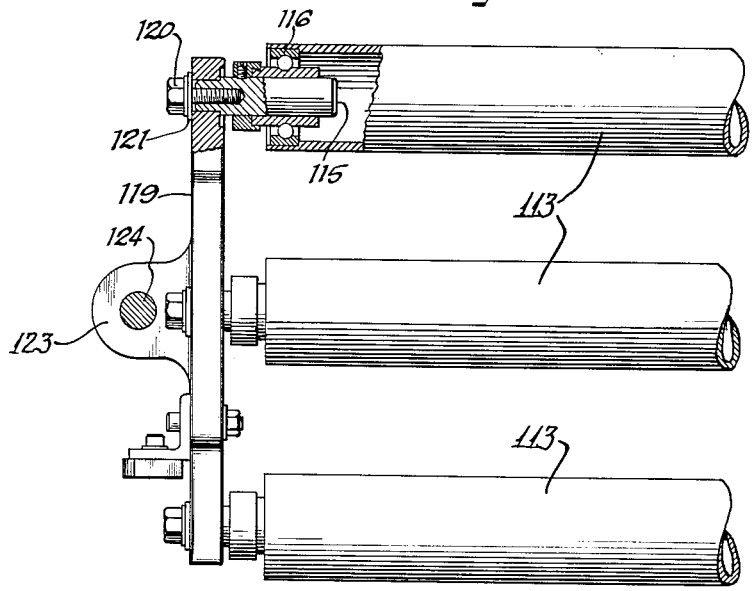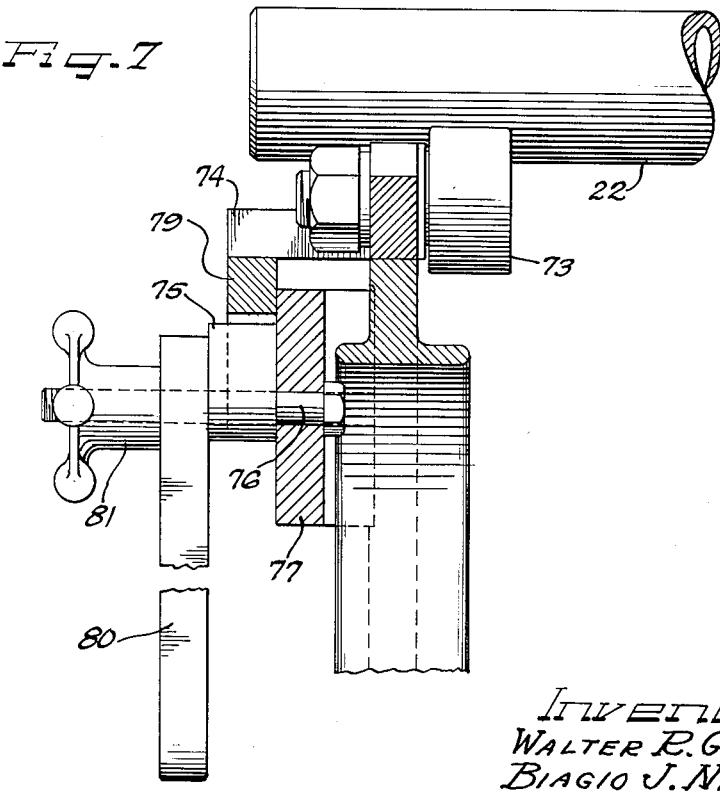

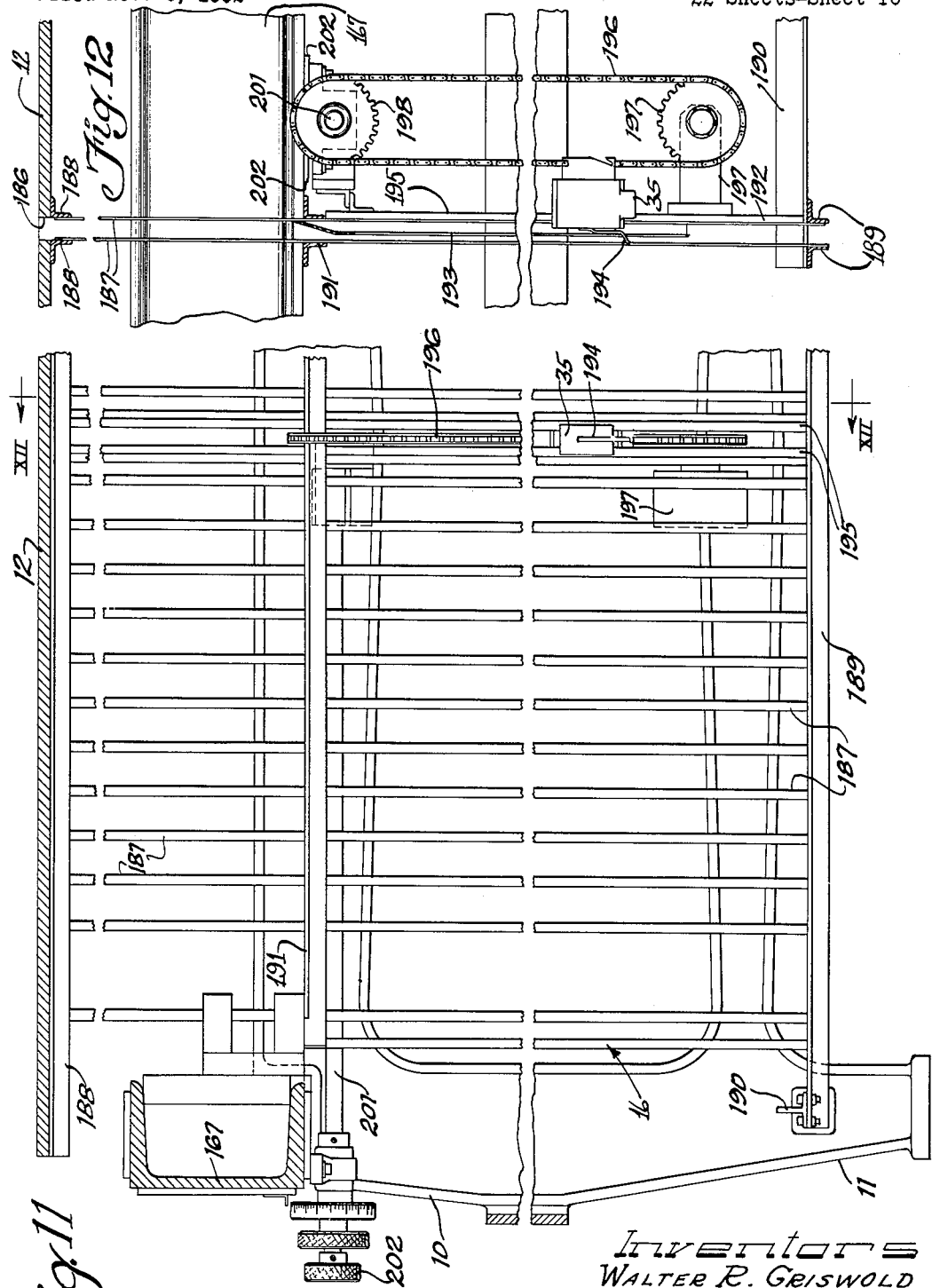

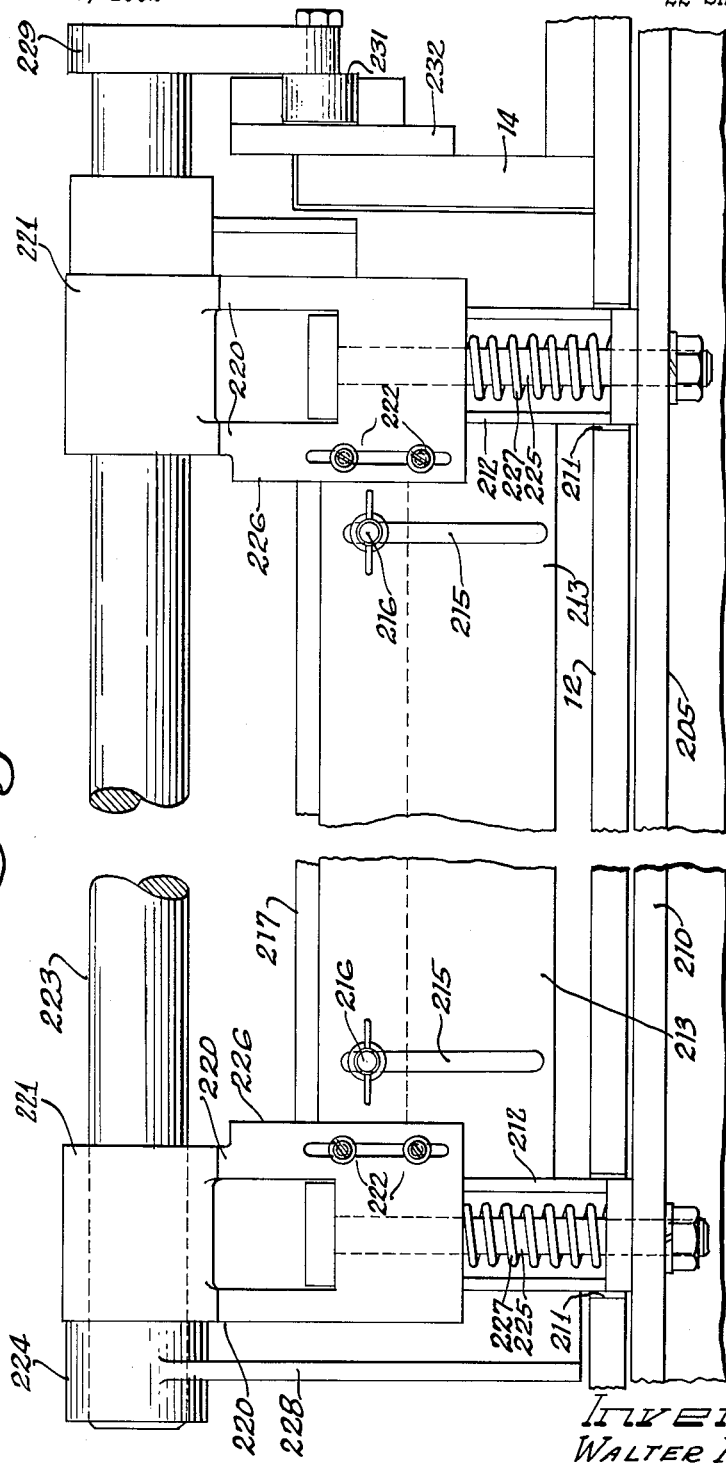

March 27, 1956 W. R. GRISWOLD ET AL 2,739,431
REAM WRAPPING MACHINE
Filed Nov. 6, 1952 22 Sheets-Sheet 12
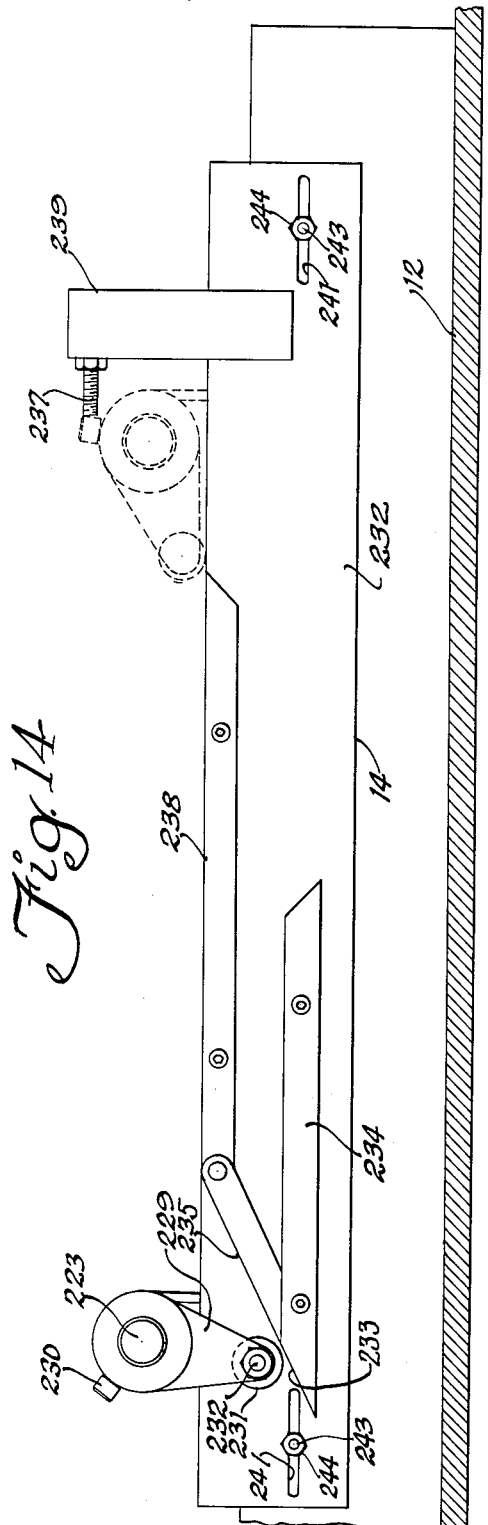
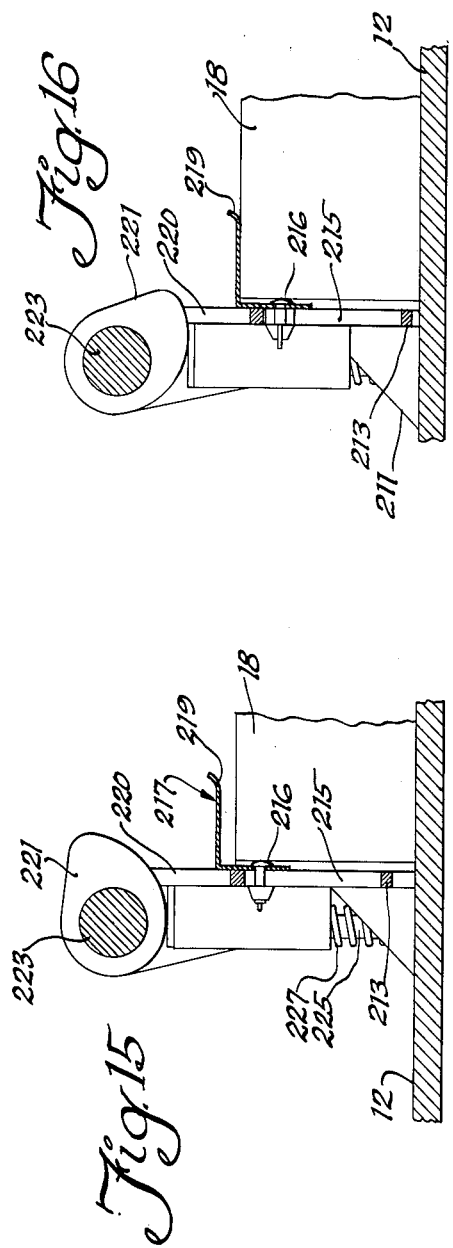
Inventors
WALTER R. GRISWOLD
BIAGIO J. NIGRELLI

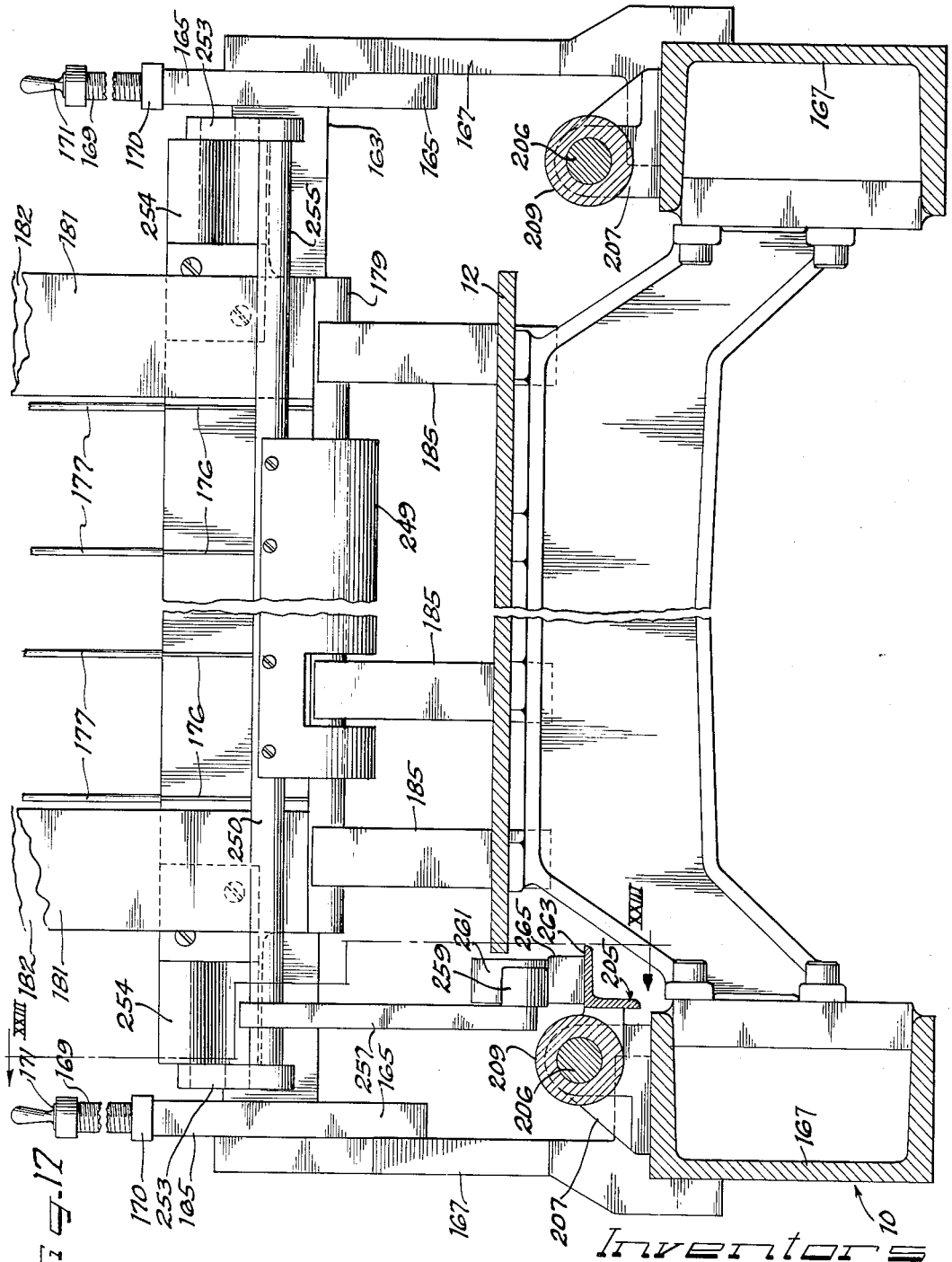

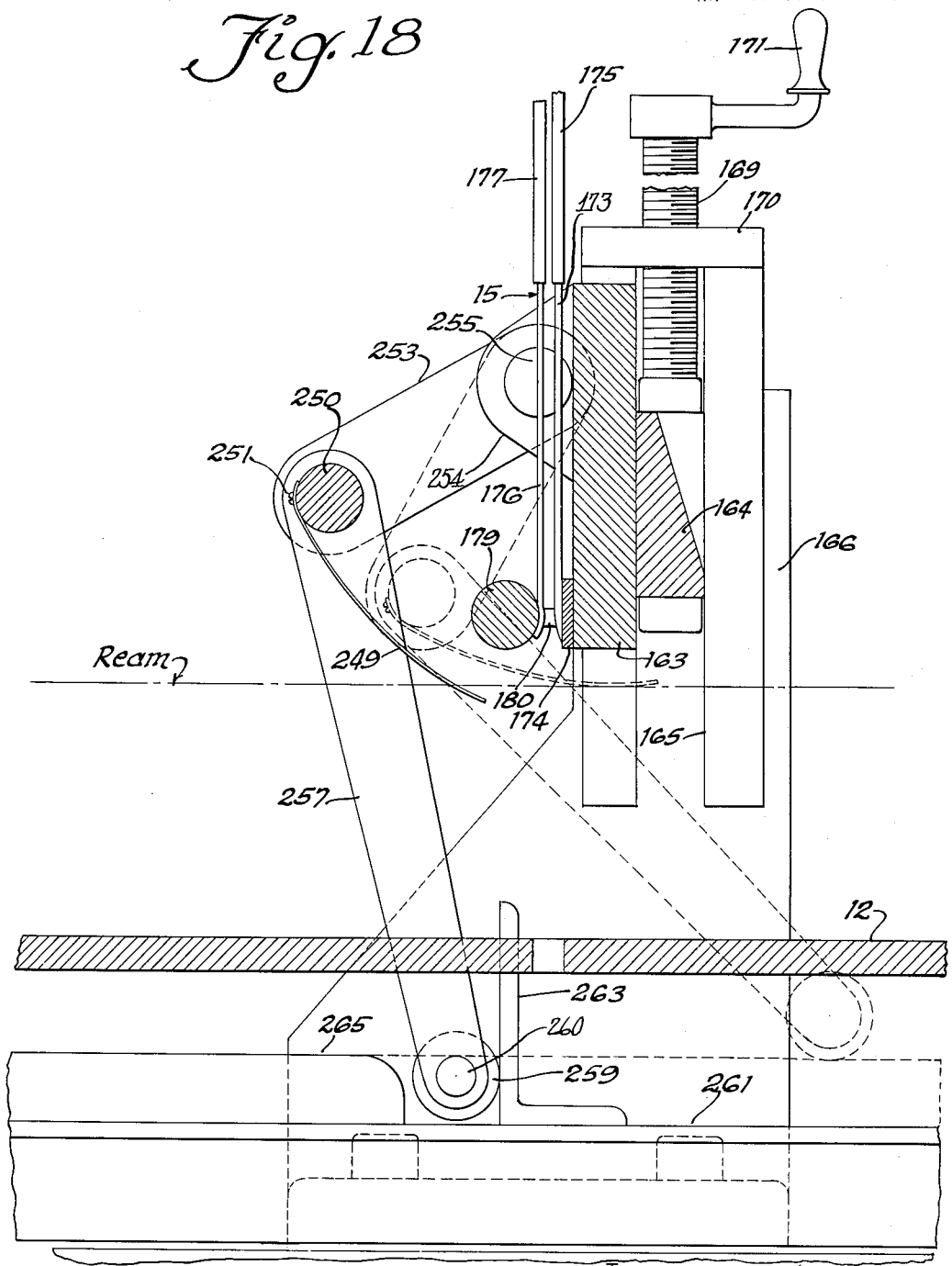

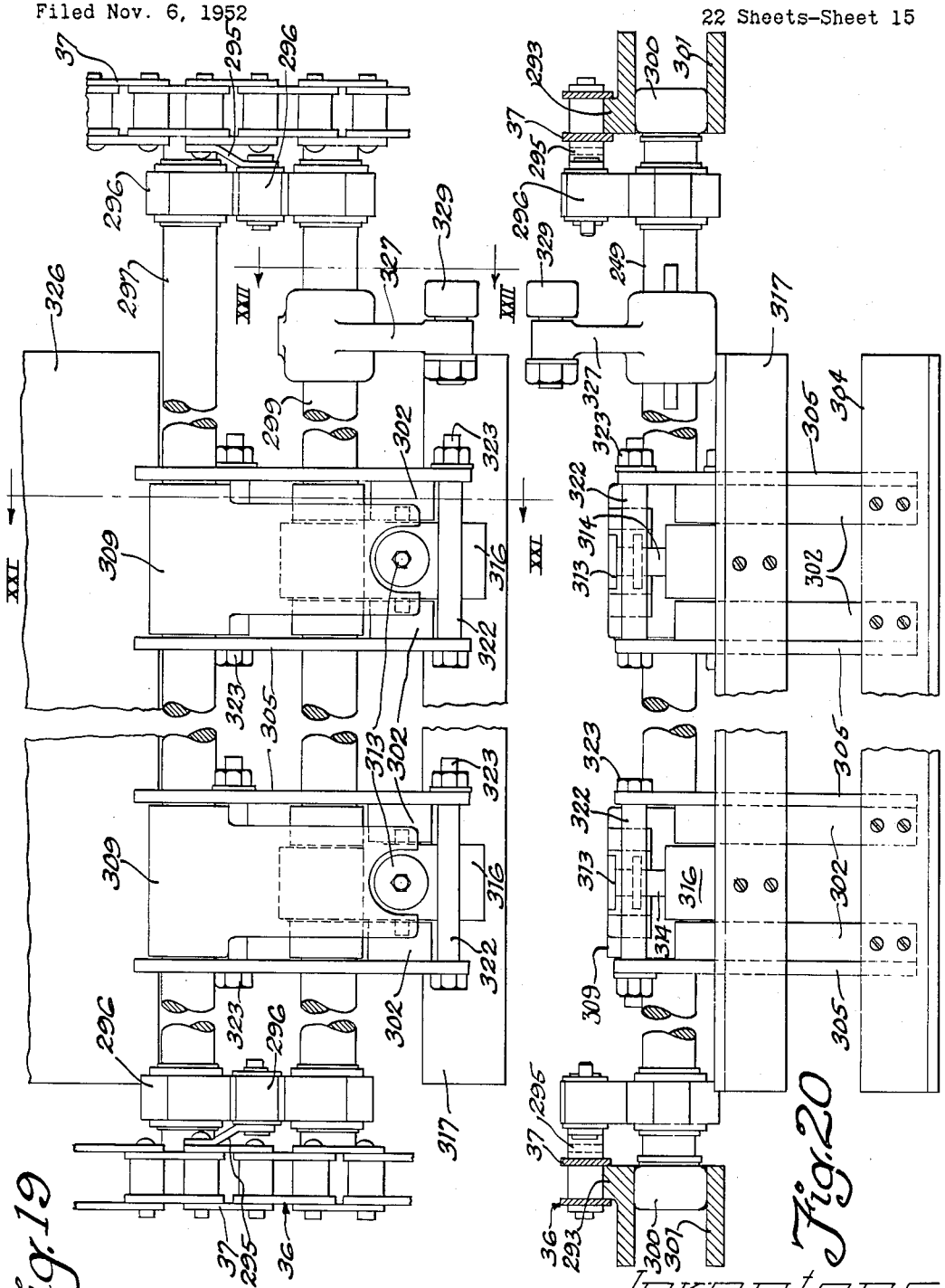

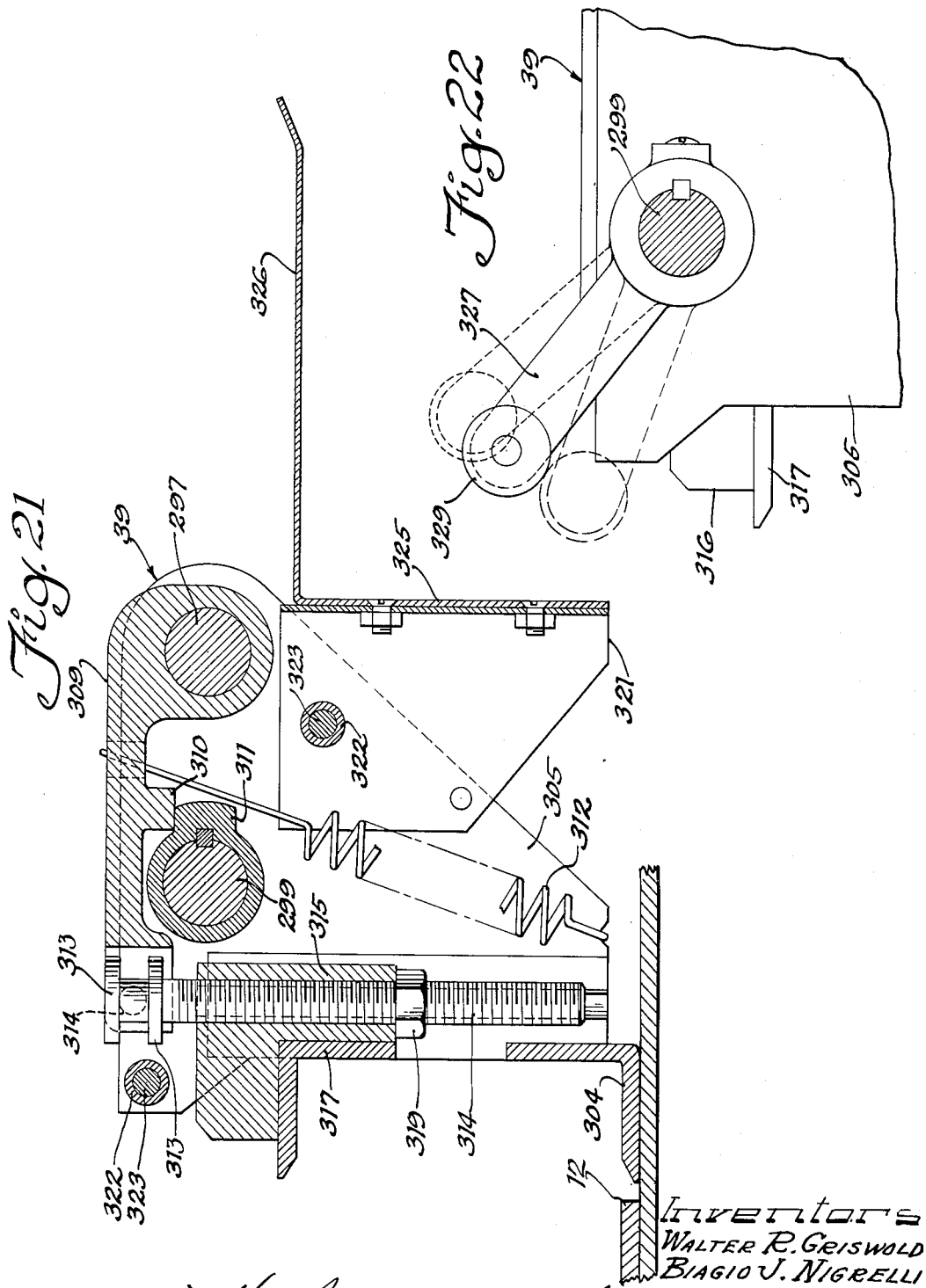

March 27, 1956 — W. R. GRISWOLD ET AL — 2,739,431
REAM WRAPPING MACHINE
Filed Nov. 6, 1952 — 22 Sheets-Sheet 17

Inventors
WALTER R. GRISWOLD
BIAGIO J. NIGRELLI

March 27, 1956 W. R. GRISWOLD ET AL 2,739,431
REAM WRAPPING MACHINE
Filed Nov. 6, 1952 22 Sheets-Sheet 18
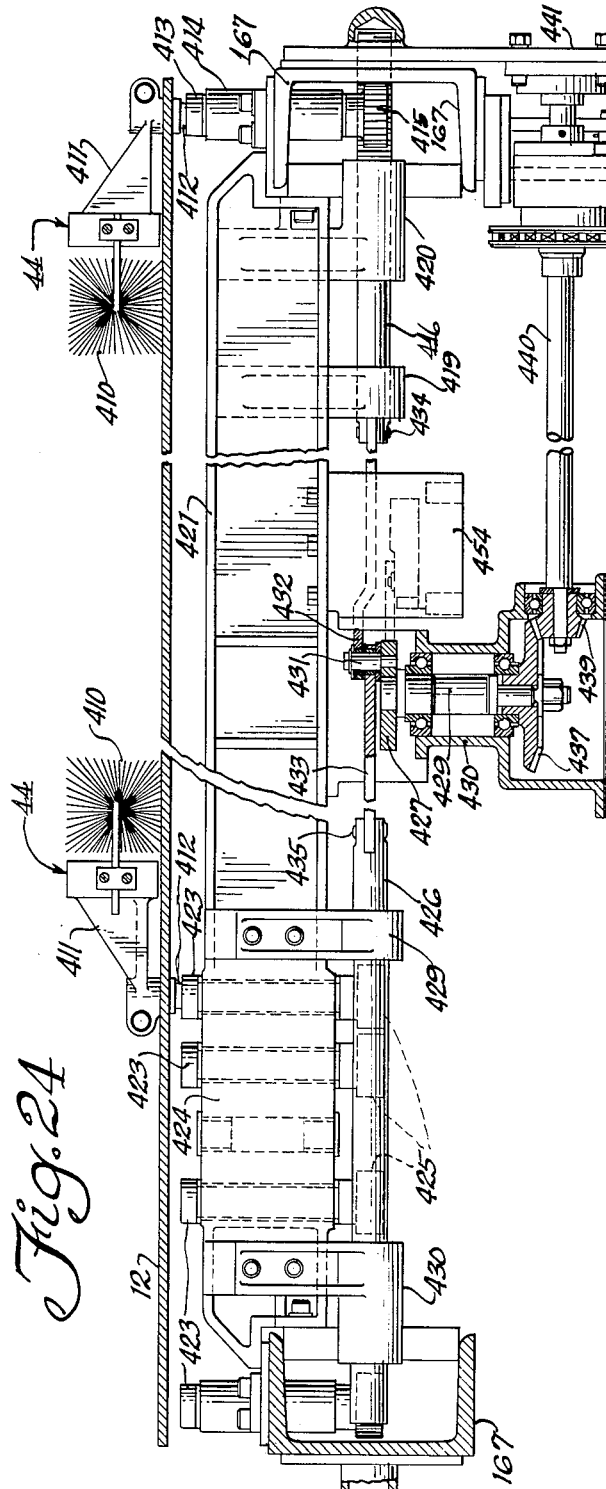
Inventors
WALTER R. GRISWOLD
BIAGIO J. NIGRELLI

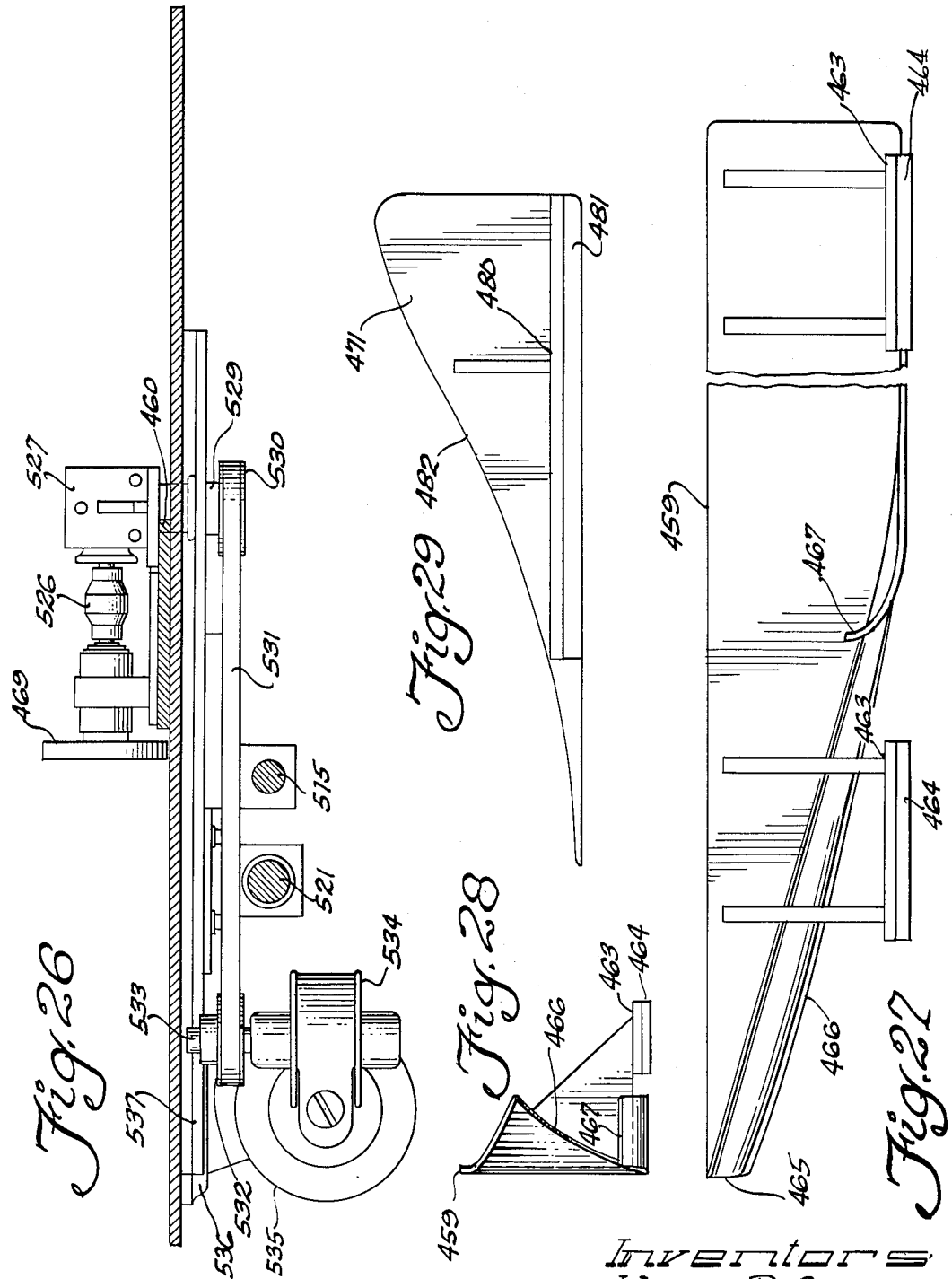

March 27, 1956 W. R. GRISWOLD ET AL 2,739,431
REAM WRAPPING MACHINE
Filed Nov. 6, 1952 22 Sheets-Sheet 20
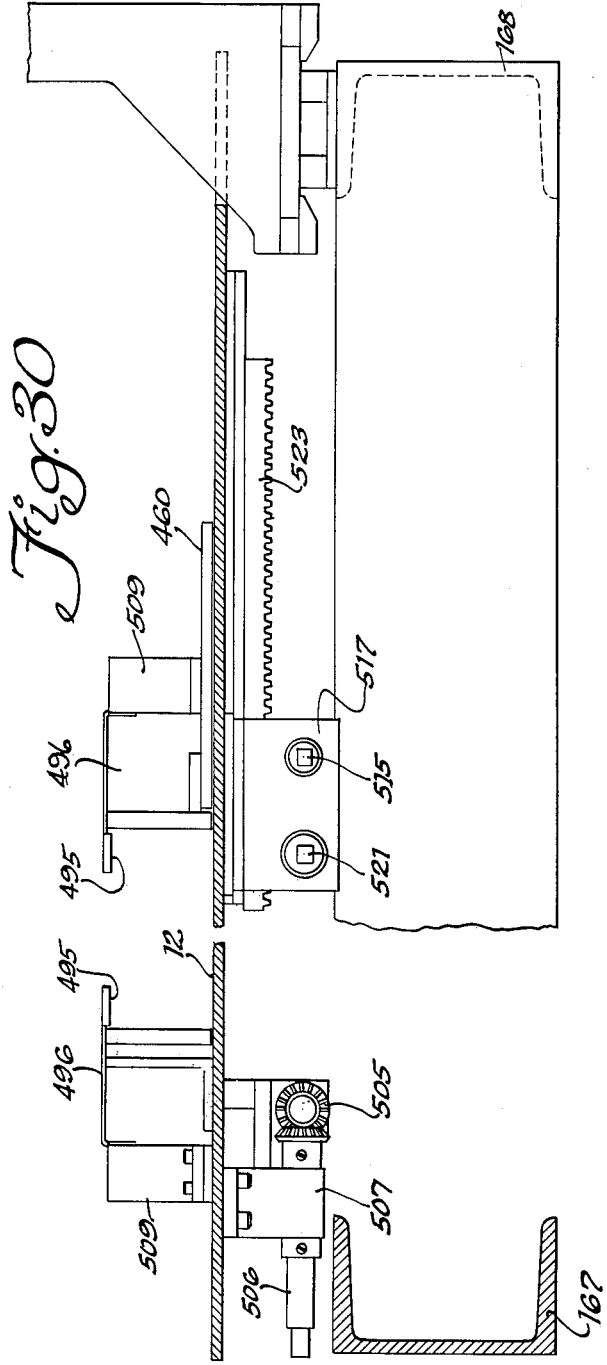
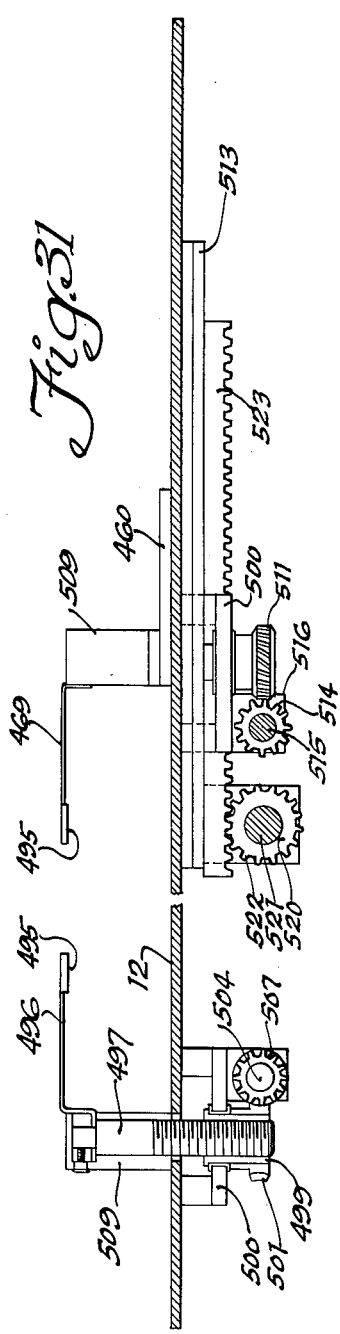
Inventors
WALTER R. GRISWOLD
BIAGIO J. NIGRELLI
by Attys.

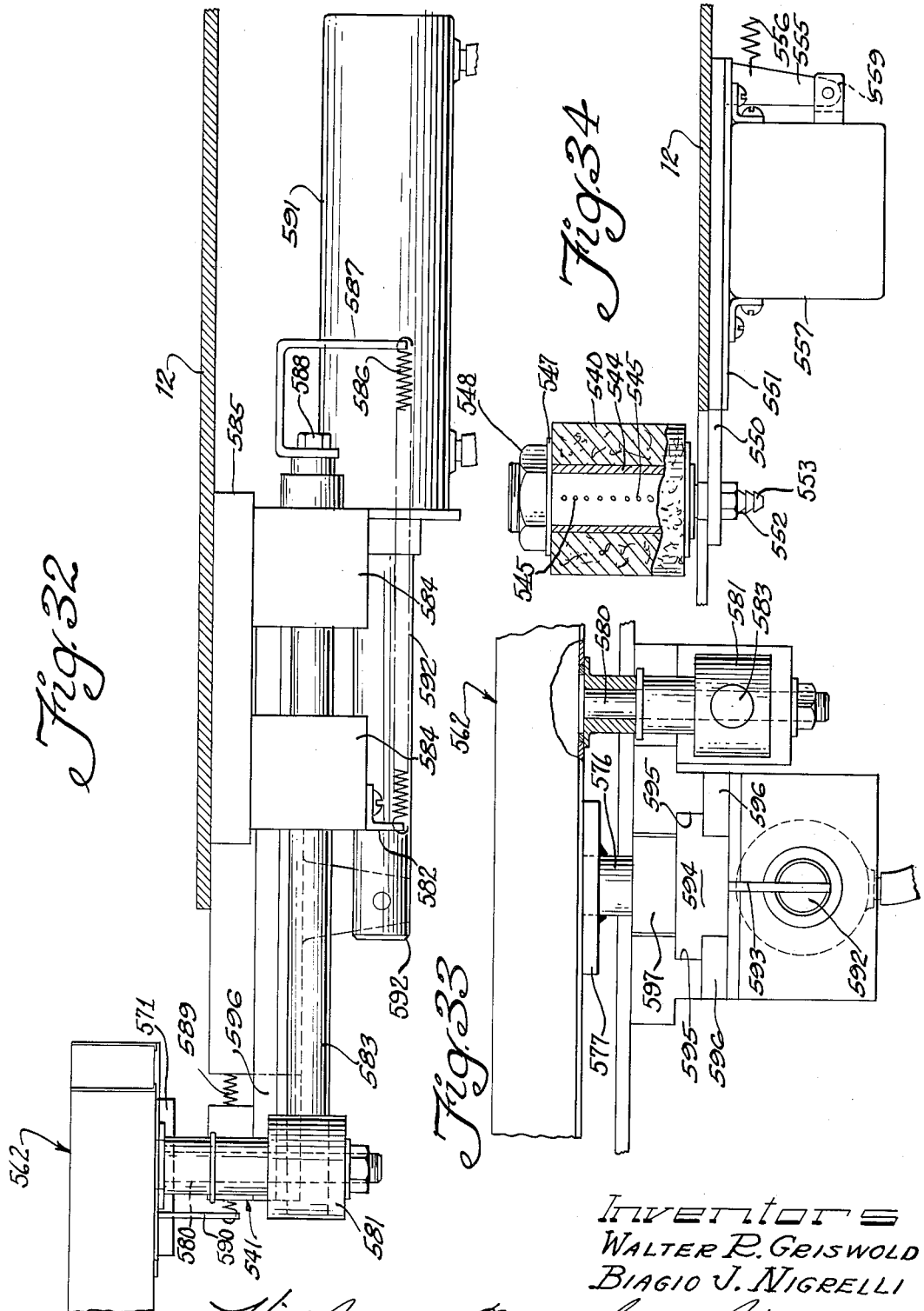

March 27, 1956 W. R. GRISWOLD ET AL 2,739,431
REAM WRAPPING MACHINE
Filed Nov. 6, 1952 22 Sheets-Sheet 22

Inventors
WALTER R. GRISWOLD
BIAGIO J. NIGRELLI

United States Patent Office 2,739,431
Patented Mar. 27, 1956

2,739,431

REAM WRAPPING MACHINE

Walter R. Griswold, Evanston, and Biagio J. Nigrelli, Skokie, Ill., assignors to Nekoosa-Edwards Paper Company, Port Edwards, Wis., a corporation of Wisconsin Application November 6, 1952, Serial No. 319,154

28 Claims. (Cl. 53—231)

This invention relates to improvements in wrapping machines and more particularly relates to a new and improved form of wrapping machine for automatically packaging reams of paper.

A principal object of our invention is to provide a new and improved wrapping machine packaging reams of paper of folio size with relatively heavy wrapping paper.

Another object of our invention is to provide a novel wrapping machine particularly adapted to wrap large reams of paper and constructed and arranged with a view toward utmost simplicity, safety and dependability in construction and operation.

A further and principal object of our invention is to provide a novel and improved form of wrapping machine for efficiently wrapping large reams of paper of varying dimensions which may readily be adjusted in accordance with the size of ream to be wrapped.

A further object of our invention is to provide a wrapping machine, packaging large reams of paper while traveling along a uniplanar surface.

Still another object of our invention is to provide a ream wrapping machine for wrapping reams of paper including a novel and efficient form of feed and storage means for the wrapping paper, supplying paper for storage from a roll of wrapping paper independently of the feed for wrapping purposes, and stopping the feed for wrapping purposes up on the supply of a wrapper of the required length.

Still another object of our invention is to provide a novel and improved form of wrapping machine for large reams of paper including a paper feed and stop means therefor, stopping the feed of the paper at predetermined wrapper lengths and including shearing means for shearing the paper to wrapper length, at the end of the feeding operation thereof.

Still another object of our invention is to provide a simplified and improved wrapping machine for wrapping large reams of paper arranged to maintain the sheets of the ream in aligned relation during the wrapping operation and to tightly wrap the ream and seal the wrapper thereto in a continuous feeding operation of the ream in a single plane.

A further object of our invention is to provide an automatic wrapping machine for wrapping reams of paper of folio size having a novel form and construction of trailing end folding and gluing means, wrapping the trailing end of the wrapper over the trailing end of the ream and during the wrapping operation wiping the end of the wrapper over a glue roller and pressing the glued end of the wrapper with the leading edge thereof, and setting the glue by pressure.

A still further object of our invention is to provide a novel and improved form and construction and arrangement of folding arms engaging the trailing end of the paper from beneath the plane of travel of the ream, and pivoting upwardly and wiping the trailing end of the wrapper along a glue roller and engaging the trailing end of the wrapper with the leading end thereof, wrapped over the leading end of the ream, and then applying pressure and heat thereto, to set the glued seam.

A still further and important object of our invention is to provide a novel and improved wrapping machine having a pusher gripping the trailing end of a ream to prevent displacement of the sheets thereof and pushing the ream through a vertically guided wrapper, and having a hold down controlled by operation of the pusher and engaging the top of the leading end of the ream during pushing movement thereof into the wrapper.

Still another object of our invention is to provide a novel and improved form of conveying and forming apparatus for a wrapping machine forming the wrapper to the leading edge of the ream and gripping and pulling the ream to a trailing end wrapping station, and then releasing the ream to effect a dwell in the travel thereof and pushing the ream for further wrapping operations.

Still another important object of our invention is to provide a novel and improved wrapping machine including two spaced orbitally traveling conveyor chains traveling in vertical planes and having spaced grippers carried thereby engaging and forming the wrapper around the leading edge of the ream, pulling the ream to a second wrapping station, wrapping the trailing edge of the wrapper around the trailing edge of the ream and at the same time applying glue thereto and setting the trailing to the leading edge of the wrapper by pressure and heat, and then engaging the trailing edge of the wrapped ream by the next succeeding gripper and pushing the ream for succeeding wrapping and gluing operations.

In carrying out our invention we provide an improved form of wrapping apparatus ream in which the trailing edge of the wrapper is wrapped over the trailing edge of the ream from beneath the path of travel of the ream, and contacts a glue roller during this wrapping operation; wherein a pressure pad presses the trailing to the leading edge of the wrapper and sets the glued seam by heat and reciprocating tucking brushes tuck the projecting ends of the wrapper inwardly along the sides of the ream, and folding plows and intermediate glue rollers fold the overlapping ends downwardly and apply glue to the lower overlapping ends of the wrapper and then fold them upwardly, and then pressure pads which may be heated, engage and set the glued ends of the ream during travel therealong, and in which moistening and labeling means may then moisten an end of the package and apply a label thereto, all during progression of the ream along a table in a single plane.

These and other objects of our invention will appear from time to time as the following specification proceeds and with referenec to the accompanying drawings wherein:

Figure 3a is a view in side elevation of a rear continuation of the machine shown in Figure 1;

Figure 4 is a plan view of the forward portion of the machine shown in Figure 1;

Figure 5 is a fragmentary view in side elevation illustrating the support for one end of the roll of wrapping paper on the machine;

Figure 6 is a fragmentary view in side elevation of the roll support shown in Figure 5, with certain parts thereof shown in transverse section;

Figure 7 is a transverse sectional view taken through the opposite end of the support for the paper roll from that shown in Figure 5 illustrating the means for aligning the paper roll with the festoon feed rolls;

Figure 9 is a fragmentary transverse sectional view taken through the festoon rolls, showing certain details of the movable support therefor;

Figure 10 is an enlarged fragmentary plan view of the movable carriage for the festoon rolls;

Figure 11 is a fragmentary sectional view toward the machine from the forward end thereof and taken through the support table for the reams adjacent the forward ends of the paper guides in order to illustrate certain details of the paper guide chute beneath the top of the ream supporting and wrapping table, and the stopping means for the wrapper when at the required wrapper length;

Figure 12 is a fragmentary longitudinal sectional view taken substantially along line XII—XII of Figure 11 and illustrating certain other details of the guide chute and stop not shown in Figure 11.

Figure 13 is an enlarged detail end view looking toward the machine from the forward end thereof and showing certain details of the pusher and ream gripping mechanism for pushing the paper into engagement with a vertically guided sheet of wrapping paper to initially wrap paper around the leading end of the ream;

Figure 14 is a fragmentary detail view in side elevation of the side guide and pusher mechanism at the entering end of the machine, illustrating the cam control means for clamping and releasing the ream;

Figure 15 is a transverse sectional view taken through the pusher mechanism, substantially along line XV—XV of Figure 13 showing the clamp out of engagement with the ream;

Figure 16 is a view somewhat similar to Figure 15, but showing the clamp in clamping engagement with the ream;

Figure 17 is a transverse sectional view taken through the upper part of the machine just ahead of the vertical paper guide chute therefor, and illustrating certain details of the frame construction and front hold down means for the ream;

Figure 18 is a fragmentary transverse sectional view taken substantially along line XVIII—XVIII of Figure 17 and showing certain details of the hold down for holding down the sheets of the ream at the advance end thereof;

Figure 19 is a partial fragmentary plan view of the conveyor mechanism showing a clamping device for gripping and forming the wrapper around the leading edge of the ream and pulling the ream along the support table for certain additional wrapping operations;

Figure 20 is an end view of a clamping device looking from the forward end of the machine toward the clamp and showing the support tracks therefor and conveyor chains for moving the clamping device along the table in transverse section;

Figure 21 is a fragmentary transverse sectional view taken substantially along line XXI—XXI of Figure 19;

Figure 22 is a fragmentary transverse sectional view taken substantially along line XXII—XXII of Figure 19;

Figure 24 is a transverse sectional view taken through the machine, showing the tucking brushes for tucking in the opposite ends of the wrapper along the ream, and the reciprocable drive mechanism therefor;

Figure 25 is a fragmentary plan view looking from beneath the top of the table in order to show certain details of the drive to the tucking brushes not shown in Figure 24.

Figure 26 is a fragmentary transverse sectional view taken in advance of one of the glue rollers and showing the adjustable support and drive therefor;

Figure 27 is a fragmentary detail view in side elevation, showing a folding plow for folding an overlapping flap of the wrapper downwardly along one side of the ream;

Figure 28 is an end view of the plow shown in Figure 27 and showing certain details thereof not shown in Figure 27;

Figure 29 is an enlarged view in side elevation of an advance folding plow, for folding a lower overlapping flap of the wrapper upwardly along the downwardly folded flap thereof;

Figure 30 is a fragmentary transverse sectional view illustrating certain details of the means for adjusting the distance between the folding plows;

Figure 31 is a transverse sectional view taken through the machine substantially along line XXX—XXX of Figure 4a and illustrating certain other details of the adjusting means not shown in Figure 30;

Figure 32 is a fragmentary end view of the machine looking toward the discharge end thereof showing the table top in transverse section and showing certain details of the labeler;

Figure 33 is an end view of the labeler with certain parts thereof broken away and certain other parts shown in section;

Figure 34 is a fragmentary transverse sectional view taken through the table at the moistener roller in order to show certain details of construction thereof;

*Machine in general*

Figure 1:
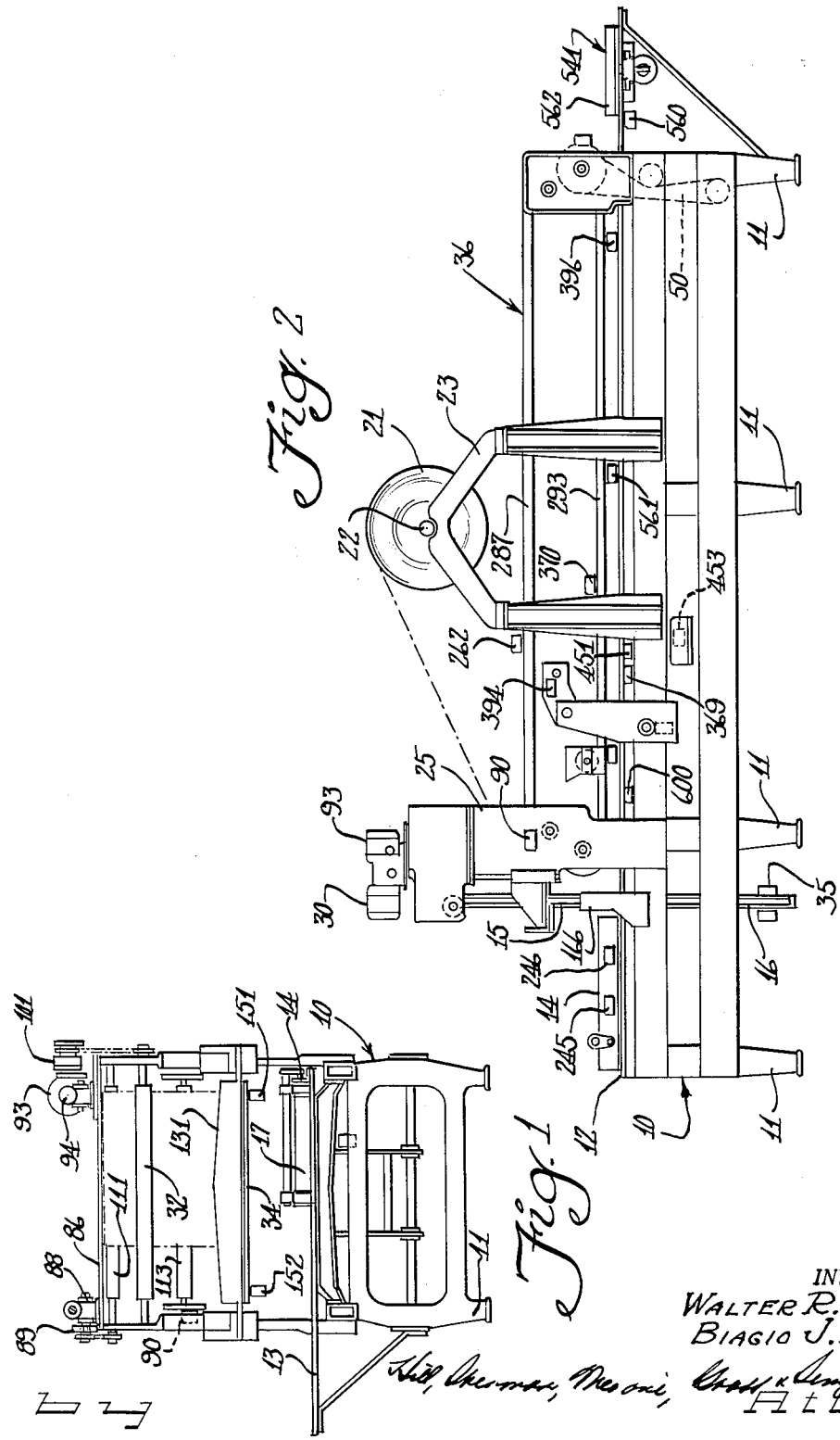
Figure 1 is a front end view of a ream wrapper constructed in accordance with our invention.

In the embodiment of our invention illustrated in the drawings, the machine includes generally a frame 10 having spaced legs 11, 11 and a table 12 supported on said legs and extending for the entire length of said frame. The top of the table 12 is of substantially a single level and forms a support for reams 18, along which said reams are moved for the entire wrapping and sealing operation.

At the entering end of the table 12 is a side extension 13 on the same level as the table, and onto which the reams 18 are placed for movement onto the table into engagement with a side guide or gauge 14. The reams may then be progressed along the side guide 14 into a wrapper 20 retained in a vertical position transversely of the table in upper and lower paper guide chutes 15 and 16, the guide chute 15 leading to the table and terminating in vertically spaced relation with respect thereto, and the guide chute 16 leading downwardly from a slot 186 extending transversely of said table. A pusher bar 17 is provided to clamp the trailing end of the ream and push the ream into engagement with the wrapper 20 extending vertically along the guides 15 and 16, and initially form the paper to the leading end of the ream.

The extension 13 and table 12 adjacent the entering end thereof are shown as being provided with a plurality of air holes 19, 19 leading therethrough and connected with a source of supply of air under pressure to facilitate movement of the heavy reams along the extension 13 and table 12 into engagement with the side guide 14.

The wrapper 20 is shown as being supplied from a roll of wrapping paper 21, rotatably supported on a transverse shaft 22. The shaft 22 is adjustably supported adjacent its ends on upright support standards 23, 23 extending upwardly from the table 12 intermediate the ends thereof. The wrapper is shown as being trained downwardly from the roll 21 under a breaker bar 24, mounted between upright side frame members 25, 25, extending upwardly from the frame 10 and table 12 in advance of the guides 15 and 16.

From the breaker bar 24, the paper is shown as being trained upwardly between two engaging festoon feed rolls 26 and 27, serving to supply paper from the roll 21 to a festoon 29 storing the paper web for use. The pinch roll 27 is shown as being driven from a motor 30, as will hereinafter be more clearly described as this specification proceeds.

From the festoon 29 the paper web is shown as being trained over an idler roll 31 and downwardly between two engaging paper feed rolls 32 and 33, the nip of which is in alignment with the paper guide 15. From there the paper is trained downwardly past a slitting knife 34 into and along the paper guide chutes 15 and 16 into engagement with a limit switch 35 in the paper guide chute 16, for stopping travel thereof, as will hereinafter more clearly appear as this specification proceeds.

While a limit switch is shown as limiting downward feed of the wrapper and determining the length thereof, a limit switch need not be used and a photoelectric cell, or any other desired form of stop for the feed of the web may be substituted therefor.

The machine also includes pulling and pushing conveyor 36 including two laterally spaced parallel conveyor chains 37 orbitally guided to move along the top of the table 12 in vertical planes extending along opposite sides of said table. Said chains are shown as having clamping and pushing devices 39, 39 carried thereby in spaced relation with respect to each other and extending across the top of the table for forming the wrapper to the leading edge of the ream at the discharge side of the guide chutes 15 and 16. Said clamping and pushing devices are provided to clamp the wrapper 20 around the leading end of the ream and pull the ream to a trailing end folding station and then release the ream and provide a dwell in the travel thereof for folding and gluing the trailing end of the wrapper to the leading end thereof lying across the top of the ream and then engage the ream with a next succeeding clamping and pushing device and push the ream through the succeeding wrapping operations.

A motor 45 mounted on the main frame 10 beneath the table 12 at the entering end of the machine, is provided to operate the pusher 17 in a feeding direction, to drive end tuckers 44, 44 tucking the ends of the wrapper along the side of the ream and to drive the conveyor chains 37, 37. A longitudinal shaft 46 driven by said motor through a speed reducer 47 is provided to drive said end tuckers and conveyor chain. A speed reducer 49 at the end of the shaft 46 opposite the speed reducer 47 is shown as driving the conveyor chains 37, 37 through a chain and sprocket drive 50, driving a transverse shaft 51. A safety release clutch (not shown) may be provided in the drive to the chains 37, 37 to release the drive and shut down the machine, upon predetermined overload conditions in any well known manner. The transverse shaft 51 is herein shown as having spaced drive sprockets 54, 54 keyed thereon for driving the chains 37, 37.

*Wrapper roll support*

The roll of wrapping paper 21 is shown as being supported on its shaft 22 for lateral tilting movement about one end thereof to align the paper on the roll with the festoon feed rolls 26 and 27. As herein shown the shaft 22 is supported at one end on the left hand support standard 23, when looking toward the front end of the machine on a laterally adjustable support bracket 55, adjustable to accommodate the standards for varying lengths of rolls and support shafts therefore (see Figures 5 and 6).

The support bracket 55 is shown as consisting in two parallel spaced vertically extending plates 56, 56, spaced apart by collars 57, 57 on pins or rivets 58, 58 and connecting said plates together. The plates 56, 56 are shown as being slidably mounted on parallel spaced rods 59 adjacent their lower ends. The rods 59, 59 are shown as being secured to a plate 60 secured to and extending along the outside of a support standard 23 and as extending outwardly therefrom. A threaded shaft 61 is shown as being rotatably secured to the plate 60 and as extending laterally therefrom through the plates 56, 56. The shaft 61 is shown as having a collar 63 threaded thereon and disposed between the plates 56, 56. A hand wheel 65 is shown as being secured to the outer end of the shaft 64 for rotating the same and adjustably moving the bracket 55 inwardly or outwardly with respect to the associated support standard 23 in an obvious manner.

The plates 56, 56 are shown as being recessed at their upper ends as indicated by reference character 66 to rotatably receive the transverse shaft 22. The two collars 57, 57 mounted between the plates 56, 56 on opposite sides of the recess 66 engage a roller 67 rotatably mounted on the shaft 22 to rotatably support an end of said shaft.

The shaft 22 may have a brake drum 69 mounted thereon, yieldably engaged by a friction band 70, to retard rotation of the shaft 22 and the roll of paper 21 in an unwinding direction.

The opposite end of the shaft 22 from the hand wheel 65 is shown as being mounted on spaced rollers 73, 73 mounted in a roller support structure 74, slidably mounted in the right hand support standard 23 for movement therealong. A cam 75 rotatably mounted on a pin or bolt 76, secured to and extending outwardly from a plate 77 is provided to move the adjacent end of the shaft 22 longitudinally of the machine and align the paper on the roll 21 with respect to the nip between the pinch rolls 26 and 27. As herein shown the cam 75 extends within a downwardly opening recessed portion of a block 79 secured to and projecting downwardly from the roller support 74. A hand lever 80 is shown as being rotatably mounted on the bolt 76 adjacent the cam 75, said hand lever may be secured to said cam for turning said cam and varying the position of the adjacent end of the shaft 22 along the support standard 23 in an obvious manner. A hand clamp 81 is shown as being threaded on the shaft 76 for engagement with the hand lever 80 and clamping the cam 75 into engagement with the plate 77, to hold said cam and shaft 22 in the desired position of adjustment.

*Wrapper feed and festoon*

The wrapper feed as shown in Figures 3, 8, 9 and 10 includes the festoon feed rolls 26 and 27, feeding the wrapper from the paper roll 21 to the festoon 29 and the wrapper feed rolls 32 and 33 taking the wrapper from the festoon 29 and feeding the wrapper for shearing to wrapper length. The feed roll 26 may be yieldably biased into engagement with the feed roll 27 in any suitable manner well known to those skilled in the art, so not herein shown or described. The feed roll 27, rotatably journaled in the side frame members 25, 25, is shown as being driven from the motor 30. The motor 30 is shown as being mounted on a plate 86 mounted across the tops of the side frame members 25, 25. As herein shown, the motor 30 is at the left hand side of the machine and drives a sprocket 87 through a suitable speed reducer 88 housed in a suitable housing structure extending from the end of said motor in a usual manner. An electric clutch 89, operable by a limit switch 90, upon upward movement of the festoon rolls 29 out of engagement with the switch is provided to control energization of the electric clutch and operation of the rolls 26 and 27. The sprocket 87 is shown as meshing with a drive chain 91 driving the roll 27 through a sprocket 92, keyed or otherwise secured thereto. The festoon feed rolls 26 and 27 are thus driven to take paper from the roll 21 whenever sufficient paper has been taken from the festoon 29, to disengage the festoon from the limit switch 90. When the festoon is full of paper the festoon feed rolls 26 and 27 will stop.

The paper feed rolls 32 and 33 may also be biased by spring means (not shown) into engagement with each other as is usual with such rolls. The roll 32 is herein shown as being driven from a motor 93 mounted on the plate 86 on the right hand side thereof. The motor 93 is shown as having a speed reducer 94 encased in an end casing structure thereof having a shaft 96 having a sprocket 95 keyed or otherwise secured thereto. The sprocket 95 is shown as driving a parallel transverse shaft 97 through a chain and sprocket drive 98. The shaft 97 has an electric clutch 101 thereon, for driving a coaxial sprocket 99. Said clutch like the clutch 89 may be of any well known form so is not herein shown or described in detail. The clutch 101 and sprocket 99 drive a sprocket 100 and the feed roll 32, through a drive chain 102. The clutch 101 may be energized when the pusher 17 is in the return position and the knife 34 is also in its return position and is deenergized by engagement of the edge of the paper with the limit switch 35 at the lower end of the guide 16.

The festoon 29 includes a plurality of spaced festoon rolls 111, 111, on transverse shafts 112, 112 journaled between the side frame members 25, 25 for rotation about fixed parallel horizontal axes. The festoon also includes a plurality of parallel spaced festoon rolls 113, 113 journaled at their ends on stub shafts 115, 115 on ball bearings 116, 116. The stub shafts 115 are shown as being secured to and extending outwardly from vertically movable festoon carriages 119, 119. As herein shown the stub shafts 115 each have reduced end portions extending through the carriage 119 and secured thereto as by machine screws 120, threaded in the ends of said shaft, and abutting washers 121, 121 interposed between the heads of said machine screws and the outside of the carriage 119.

Each carriage 119 is shown as having two vertically spaced laterally extending bearing bosses 123, 123 slidably mounted on a vertical guide shaft 124. The guide shafts 124, 124 are shown as being mounted at their upper and lower ends on vertically spaced support brackets 125 and 126 respectively, secured to the insides of the side frame members 25, 25 and extending inwardly therefrom. The festoon carriages 119, 119 and the spaced festoon rolls 113, 113 may thus be moved upwardly along the shafts 124, 124 by the paper web as paper is fed to the paper guide chutes 15 and 16 for shearing, when the festoon feed rolls 26 and 27 are not in operation. In a contrary manner the festoon rolls 113, 113 and brackets 119, 119 may move downwardly along the shafts 124, 124 as paper is supplied to the festoon by the festoon rolls 26 and 27 and the festoon becomes full of paper. The limit switch 90 is shown as having an arm 91 thereon operated by a trip member 127, adjustably mounted on a vertical laterally extending leg of an angle 129, secured to and extending outwardly from the festoon carriage 119, which in Figure 9 is shown as being the left hand festoon carriage.

The wrapper feed rolls 32 and 33 thus operate independently of the festoon supply rolls 26 and 27 and the festoon supply rolls operate only to take wrapping paper from the roll 21, while the paper feed rolls 32 and 33 serve only to feed paper to the guide chutes 15 and 16 for shearing and wrapping purposes. The festoon supply rolls 26 and 27 thus assure a continuous supply of paper to the festoon, and operate to maintain sufficient paper in the festoon to assure a supply of paper for wrapping purposes, without interruption in the wrapping operation, while the paper feed rolls operable independently of the festoon supply rolls operate intermittently to supply paper of the required length for shearing into wrapper lengths.

*Paper shear*

The shearing mechanism includes the movable shearing knife 34 spaced forwardly of and extending between the side frame members 25, 25 and slidably mounted on the underside of a knife support 131, for movement into engagement with the underside of a stationary knife 133, to effect shearing of the paper web in an obvious manner. The movable shearing knife 34 may be supported and guided along the bottom of the knife support 131 in any suitable manner and is shown as being operated by a fluid pressure cylinder 134 having a piston (not shown) slidable therein and having a piston rod 135 extensible therefrom. The cylinder 134 is shown as being trunnioned intermediate its ends on a trunnion support 136 shown as extending forwardly from an upright plate 137 of the knife support 131. The piston rod 135 is shown as being pivotally connected at its outer end to one arm 139 of a bell crank 140. The bell crank 140 is shown as being pivoted intermediate its ends between two spaced forwardly extending support brackets 143 on a pivot pin 144. The other arm of the bell crank 140 is shown as depending from the pivot pin 144 and as having pivotal connection with the outer end of a link 145 by means of a pivot pin 146. The link 145 is pivotally connected with an arm 147 extending rearwardly from the knife 34 by a pivot pin 149. The cylinder 134 may be double acting. The supply and release of fluid under pressure to the head and piston rod ends of the cylinder 134 may be controlled by a solenoid operated valve (not shown) the solenoid of which is energized when the leading edge of the paper engages the limit switch 35. The valve may be returned to admit fluid under pressure to the piston rod end of the cylinder 134 as by a spring (not shown), operating said valve upon engagement of the knife 34 with a limit switch 151 in its forward position, to open the circuit to the valve solenoid and deenergize the same. A similar limit switch 152, is mounted on the knife support 131, to maintain a circuit to the feed rolls 32 and 33 while the knife 34 is in a return position, and prior to engagement of the paper with the limit switch 35. It should be understood that the knife support 131 is slotted to accommodate the passage of paper therethrough between the knives 34 and 133. The knife support 131 is also adjustably mounted on the forward ends of the side frame members 25, 25 for vertical adjustable movement therealong to position the knife to shear wrappers of various desired lengths for wrapping various sizes of reams.

As herein shown the knife support has vertical guide members 153, 153 extending upwardly and downwardly from the rear end thereof and having slidable engagement with guides 154, 154 extending vertically along the forward edges of the side frame members 25, 25. Suitable gibs (not shown) may be provided to retain the guide members 153, 153 in engagement with the guides 154, 154. Adjustable movement of the knife support 131 and guide members 153, 153 along the guides 154 may be attained by pinions 155, 155 on a transverse shaft 156, journaled in the side frame members 25, 25. The pinions 155, 155 may mesh with racks 157, 157 on the inner sides of the guide members 153, 153. A hand crank or wheel (not shown) may be provided to rotate the shaft 156 and operate the pinions 155, 155 to vary the position of the knife support 131 along the side frame members 25, 25. Clamps 159, 159 threaded on screws 160, 160 extending forwardly from the forward ends of the side frame members 25, 25, may be provided to retain the knife support 131 in the desired adjusted position on the side frame members 25, 25.

*Wrapper guide chutes*

Figure 3:
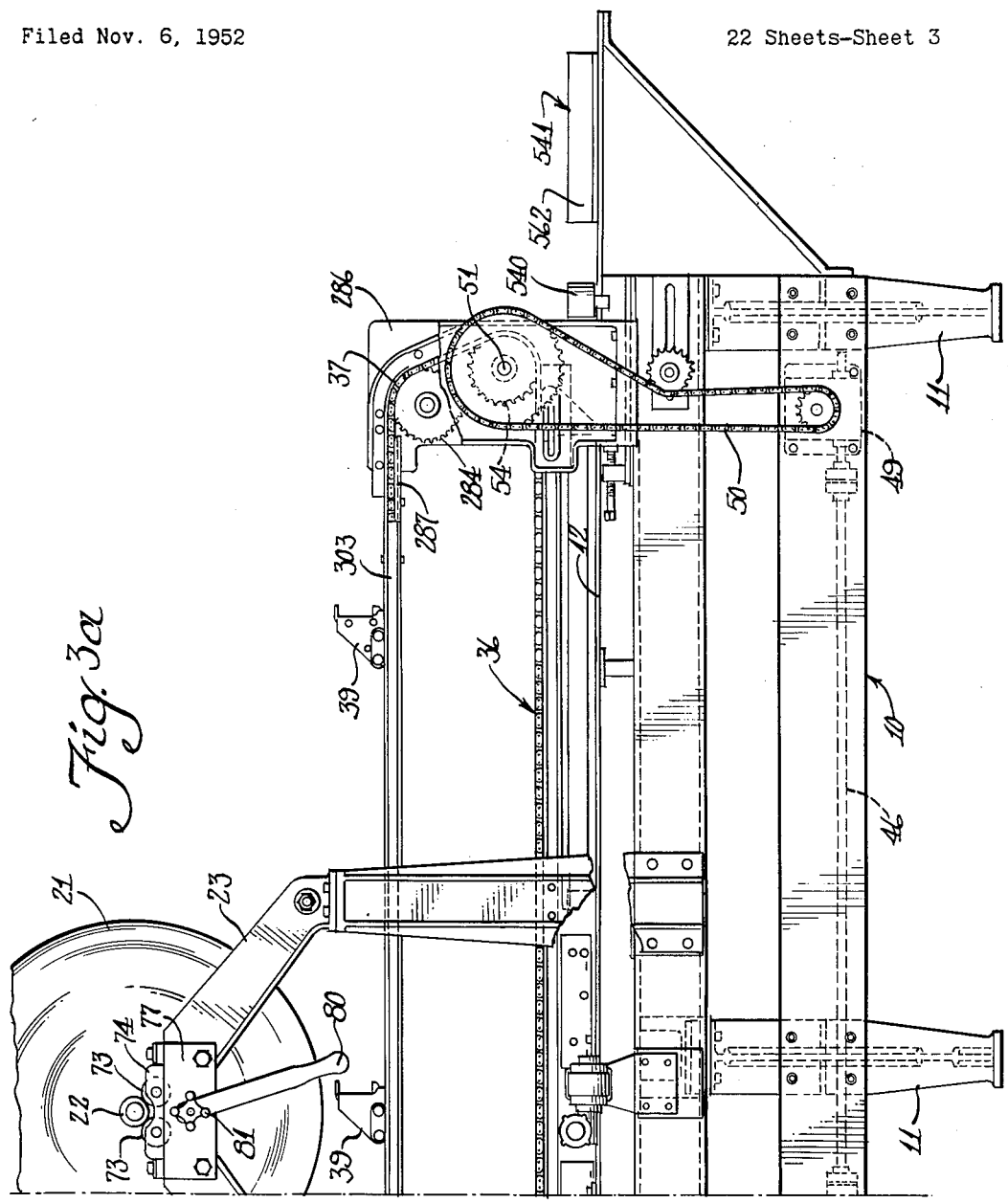
Figure 3 is an enlarged view in side elevation of the forward portion of a ream wrapping machine constructed in accordance with our invention.

The wrapper guide chute 15 is herein shown as being telescopic and as extending downwardly from a position just beneath the knife support 131 to the lower end of a transverse bar 163 (see Figures 3, 17 and 18). The bar 163 is shown as being secured at its opposite ends to the forward faces of blocks 164, 164 extending from the ends of the bar 163 and rearwardly therefrom, and slidably guided in guides 165, 165. The guides 165, 165 are shown as being mounted on the insides of upright support plates 166, 166 secured to and extending upwardly from channels 167, 167 forming side frame members of the main frame 10 and extending for substantially the entire length of said frame and connecting the legs 11, 11 thereof together.

The blocks 164, 164 are vertically moved along the guides 165, 165 and are held in desired position of adjustment by means of screws 169, 169 rotatably mounted in said blocks in a suitable manner and threaded within cross bars 170, 170 closing the tops of the guides 165, 165. A hand crank 171 is shown as being secured to the upper end of each screw 169 for rotating the same.

The telescopic guide chute 15 is shown as comprising parallel vertical inner guide rods 173, 173, secured at their lower ends to a spacer strip 174 secured to and extending along the lower end of the transverse bar 163 and spacing the rods 173, 173 forwardly of said bar. The rods 173, 173 are shown as being slidably guided within tubes 175, 175 secured to and depending from a bracket 172 secured to the knife support 131 and spaced beneath the knife 34.

Spaced from the rods 173, 173 toward the forward end of the machine are similar parallel vertical rods 176, 176 slidable within sleeves 177, 177. The sleeves 177, 177 may be secured to and depend from the bracket 172 on the outer side of the paper slot therethrough. The rods 176, 176 are shown as being suitably secured at their lower ends to the inside of a transverse bar 179, spaced from the spacer 174 toward the forward end of the machine. The transverse bar 179 is secured to the transverse bar 163 as by spacer rods 180, 180 secured to said bar at their inner ends and to the bar 79 at their outer ends. The telescopic guides 15, 15 also comprise relatively wide bearing strips 181, 181 shown as extending upwardly from the bar 179 and as having slidable engagement with corresponding strips 182, 182 depending from the knife support 131 and having slidable engagement with the insides of the strips 181, 181. The strips 181 and 182 may be spaced along the bar 179 in various desired positions to engage the edges of the wrapper and form a relatively wide smooth guide therefor.

A plurality of resilient guide strips 185, 185 are shown as being secured to the bar 179 and as extending angularly downwardly and inwardly therefrom within the slot 186 extending across the table top 12. The resilient strips 186 are shown as being turned inwardly into the slot 186 to curl the paper inwardly as it enters said slot, and cause the paper to straighten and freely move downwardly along the lower guide 16.

The strips 185 engage the outer edges of the paper outwardly of the package and the package passes therebetween. As herein shown, three strips 185 are provided. The intermediate strip 185 may be removed when the outer strips 185 are in engagement with the edges of the paper.

The lower guide chute 16 is shown in Figures 11 and 12 as comprising a plurality of spaced guide strips 187, 187 forming a continuation of the slot 186 and extending downwardly from the bottom of the table 12.

As herein shown the strips 187, 187 are secured to the vertical legs of angles 188, 188 extending along the margins of the slot 186 and depending from the bottom of the table 12. The opposite ends of the strips 187, 187 are shown as being suitably secured to the vertical legs of parallel transverse angles 189, 189. The angles 189, 189 are shown as depending from and mounted on the lower webs of beams 190, 190 connected between the legs 11, 11 of the frame 10 and forming a reinforcing structure therefore. The strips 187, 187 are likewise stiffened intermediate their ends by angles 191, 191, extending across the frame 10 and secured to and depending from the lower webs of the channels 167, 167.

The guide chute 16 likewise includes a plurality of restricting guide strips 193, 193, extending angularly inwardly from the rear guide strips 187, 187 toward the forward guide strip 187 and then extending parallel thereto, to restrict the path of the paper to engage an operating arm 194 of the limit switch 35, determining the length of the paper.

The limit switch 35 is shown as being slidably guided between parallel vertical guide members 195, 195, and as being moved along said guide members by means of an endless chain 196 trained about vertically spaced sprockets 197 and 198 journaled in brackets 199 and 200 respectively. The bracket 199 extends rearwardly from the guide members 195, 195 and the bracket 200 depends from transverse frame members 202, 202 secured to the lower webs of the channels 167, 167. The chain 196 is shown as being suitably secured at its adjacent ends to the limit switch 35, and as being operated to adjust the position of the switch 35 in accordance with the length of wrapper required to wrap a predetermined size of ream by operation of the sprocket 198. The sprocket 198 is shown as being mounted on and rotated by a transverse shaft 201 extending to one side of the frame 10 and operated from its other end by means of a knob.

*Pusher and ream clamp*

The pusher and ream clamp 17 is shown in Figures 4, and 13 to 17 as including a carriage 205, slidably movable beneath the top of the table 12 on laterally spaced longitudinal shafts 206, 206. The shafts 206, 206 are supported at their ends in longitudinally spaced support brackets 207, 207 secured to and extending upwardly from the top webs of the channels 167, 167. The carriage 205 is shown as including two laterally spaced longitudinally extending generally cylindrical slides 209, each of which is mounted on and slidably guided along the shaft 206 and connected together by transversely extending cross members 210, 210.

Two laterally spaced upright pusher members 212, 212 are shown as being secured to the cross members 210 and as extending upwardly therefrom through slots 211, 211, extending along and through the top of the table 12. A third slot 211 is provided in the table top, to enable the use of a wide pusher, where it is desired to wrap larger reams than can be accommodated by the pusher 17 shown. The pusher members 212, 212 are shown as having a pusher plate 213 carried therebetween and mounted for vertical movement therealong.

The pusher plate 213 is shown as having two laterally spaced vertically extending slots 215, 215 through which extend bolts 216, 216 extending inwardly from a clamping bar 217 and clamping said clamping bar to said pusher plate, in the required elevation with respect to the top of the table 12 to clampingly engage reams of various thicknesses. The clamping bar 217 is shown as being in the form of an angle having the bolts 216, 216 extending from the vertical leg thereof, and having a horizontal leg 219, which may be resilient, engageable with the top of the ream 18 and gripping the ream while pushing it along the table 12, into engagement with the wrapper between the guides 15 and 16.

Secured to opposite ends of the pusher plate 213 are support members 226, 226 supporting said pusher plate for vertical movement along the pusher members 212, 212 and secured to said pusher plate by cap screws 222, 222 extending through vertical slots in the support members 226, 226, and threaded within the plate 213. Extending vertically from each support member 226 are parallel spaced follower bars 220, 220, engaged at their upper ends by cams 221, 221, keyed or otherwise secured to a transverse shaft 223. The transverse shaft 223 is shown as being rockingly mounted in spaced bearing bosses 224, 224 at the upper ends of brackets 228, 228 secured to and extending upwardly from the outer sides of the pusher members 212, 212. As herein shown the support members 226, 226 are slidably mounted on headed bolts 225, 225. Said bolts are shown in Figure 12 as extending upwardly from beneath a cross member 210 through the bases of the pusher members 212, 212. The heads of said bolts are located in the space between the follower bars 220, 220. The support members 226, 226 are shown as being biased into engagement with the heads of the bolts 225, 225 by compression springs 227, 227, encircling the bolts 225, 225 and interposed between the bases of the pusher members 212, 212 and the bottoms of the support members 226, 226.

The shaft 223 and cams 221, 221 are rocked to depress the follower bars 220, 220 and the pusher plate 213, and to engage the clamping member 217 with the top surface of the ream by means of a crank arm 229, shown as being secured to the right hand end of the shaft 223 as by a set screw 230. The crank arm 229 is shown as extending along the outer side of the side guide 14 and as being spaced outwardly therefrom and having a roller 231 mounted on its lower end on a threaded pin. The roller 231 is shown in Figures 14 and 15 as being positioned inwardly of the crank arm 229, for engagement with an inclined cam surface formed by an inclined end 233 of a cam bar 234 and a pivoted inclined cam bar 235. The bars 234 and 235 extend along the outside of a plate 232 secured to the side guide 14. The cam bar 235 is pivoted on said plate 232 on a pivot pin 236, to accommodate the roller 231 to pass thereunder on its return travel. As the carriage 205 moves along the longitudinal guide shafts 206, 206, the roller 231 on the crank arm 229 will move along the inclined surfaces 233 and 235 and pivot the arm 229 in a clockwise direction. This will move the follower members 220, 220, pusher plate 213 and clamping member 217 downwardly into engagement with the top of the ream. The inclined bar 235 terminates into a horizontal cam bar 238, extending along the top of the side guide 14 for a portion of the length thereof and secured thereto, to maintain the clamp 217 into engagement with the top of the ream until the ream is pushed into the wrapper web into clamping engagement with a clamping member 39, carried by the conveyor chains 37, 37. When the roller 231 has moved beyond the end of the horizontal cam bar 238, the set screw 230 will come into engagement with a stop 237 threaded within and extending forwardly from an upright member 239 on the plate 232. This will positively pivot the cam shaft 223 in a counterclockwise direction and release the clamp bar 217 from the ream. During return travel of the carriage 205 the roller 231 will engage the underside of the cam bar 238 and move therealong into engagement with the pivoted inclined cam bar 235 and pivot said strip upwardly to accommodate the roller to pass therebeyond into registry with the forwardly facing inclined surface 233 on the end of the cam bar 234 and forming a continuation of the inclined pivoted camming strip 233. The plate 232 is shown as having two longitudinally spaced aligned horizontal slots 241, 241 extending therealong through which extend bolts 243. Nuts 244, 244 on the end of the bolts 243, 243 are provided to retain the plate 232 in adjusted relation with respect to the side guide 14.

The side guide 14 is shown as having two limit switches 245 and 246 mounted thereon and engaged by the side edge of the ream as it is moved transversely of the table 12 from the extension 13, to initiate the wrapping operation, when the clamp 39 is in the proper relation with respect to movement of the pusher 17, to have the ream pushed thereinto and to clampingly engage the advance end of the ream, as will hereinafter more clearly appear as this specification proceeds.

The carriage 205 and pusher 17 are moved along the shafts 206, 206 by means of a cam 264 keyed or otherwise secured to a transverse shaft 265. The transverse shaft 265 is shown as being driven from the motor 45 by means of a one revolution clutch indicated generally by reference character 266 coaxial with the shaft 265 and rotatably driven by a sprocket 267. Said sprocket is driven from the shaft 46 by a chain and sprocket drive 268, driven from a speed reducer indicated generally at 47. The one revolution clutch may be of any well known form and may be operated by a solenoid (not shown), to come into engagement upon energization of the solenoid and drive the shaft 265 and cam 264 for one revolution. The cam 264 is shown as engaging a roller 274 on the end of a rocking arm 275 on a rock shaft 276. An arm 277 is shown as extending upwardly from the rock shaft 276 and as being rocked thereby and as having connection with the carriage 205 through a link 279. Thus upon engagement of the one revolution clutch, the cam 264 will rotate one revolution to advance the pusher 17 for the full length of the pushing stroke thereof. The pusher 17 is returned to a retracted position along the table 12 by means of a cylinder 280 having a piston rod 281 extensible therefrom and pivotally connected with a rocking arm 283, secured to and depending from the rock shaft 276. The cylinder 280 and the piston therein need only be a single acting cylinder and the admission of fluid, such as air, under pressure thereto to return the pusher 17, may be controlled by a suitable valve (not shown) operated mechanically when the carriage 205 reaches the end of its pushing stroke.

Hold down

A pivoted hold down is provided to engage the top sheet of the ream at the advance end thereof, and hold the sheets of the ream together during advance into the wrapper 20 between the guide chutes 15 and 16 and to initially tuck the wrapper to conform to and be picked up by the ream. As herein shown the hold down comprises a relatively thin arcuate hold down shoe, which may be made of metal and which is shown as being secured to a transverse shaft 250 as by machine screws 251, 251. The transverse shaft 250 is shown as being mounted at its ends on the outer ends of laterally spaced rocking arms 253, 253 and secured thereto, for bodily movement therewith. The rocking arms 253, 253 are shown as being mounted on and extending along the outer sides of laterally spaced bosses 254, 254 on pivot pins 255, 255. The bosses 254, 254 extend forwardly from opposite ends of the transverse bar 163.

The hold down shoe 249 is adapted to drop by gravity about the axis of the shafts 255, 255 from the position shown by solid lines in Figure 17 to the dotted line position shown in this figure into engagement with the top sheet of the ream. Control of movement of the rocking arms 253, 253 and the tucker plate 249 is by a control leg 257 secured to the shaft 250 and depending therefrom. A roller 259 is rotatably mounted on the lower end of said leg 257 on a pivot pin 260, for engagement with the horizontal leg of an angle 261, herein shown as being secured to and as projecting from the carriage 205. The roller 259 also abuts the vertical leg of an angle 263 for movement with the carriage 205. As the carriage 205 moves along the table 12 when pushing a ream 18 to pick-up a wrapper in the chutes 15 and 16, the roller 259 will follow the angle 261. The rocking arms 253, 253 and hold down shoe 249 will then pivot downwardly into engagement with the advance end of the top sheet of the ream and the vertically guided wrapper. As the roller 259 and arm 257 move along the frame 10 to engage the hold down shoe 249 with the ream and wrapper, and as the ream picks up the wrapper, the roller 259 will come into engagement with and ride upwardly along the arcuate surface of a horizontally extending cam 265, positively holding the tucker plate 249 in the lowermost engaging position shown in Figure 17 and preventing displacement of the advance sheets of the ream when picking up the wrapper.

Upon movement of the ream into engagement with the side guide 14 and the limit switches 245 and 246 thereon and upon movement of the conveyor 36 and the clamps and pushers 39, 39 carried thereby, into the proper position controlled by a limit switch 262 engaged by a clamp and pusher member 39 when traveling along the upper run of the conveyor, the carriage 205 and pusher 17 will move toward the wrapper in the chutes 15 and 16 into engagement therewith. During this travel the hold down shoe 249 will come into engagement with the advance end of the top sheet of the ream, holding the sheets of the ream down, while being pushed into the wrapper between the chutes 15 and 16. This pushing operation continues until the ream and wrapper have been pushed into engagement with the clamping bars of a clamp and pusher member 39 and clampingly engaged thereby, to form the wrapper around the leading edge of the ream and pull the wrapper from the guide chutes 15 and 16 and the partially wrapped ream to a trailing end folding station.

Ream clamping bar and pusher conveyor

The clamping and pushing conveyor 36, forming the wrapper around the leading edge of the ream and pulling the ream along the top surface of the table 12 to the trailing end folding station and then releasing the ream for the trailing end folding and gluing operation, and then pushing the ream for the remaining wrapping operations, includes the two spaced endless conveyor chains 37, 37 and the spaced clamp pusher members 39, 39 carried therebetween.

As herein shown the endless chains 37, 37 are trained about drive sprockets 54 on the transverse shaft 51 at the rear or discharge end of the machine, and upwardly therefrom to and around idler sprockets 284, 284 on transverse shafts 285 supported in upright support standards 286, 286 extending upwardly from the top of the table 12 along opposite sides of the main frame 10. From thence the endless chains 37, 37 are supported and guided along guide rails 287 extending from the support standards 286, 286 toward the entering end of the machine and supported at their forward ends on the side frame members 25, 25. From thence the chains 37, 37 turn about idler sprockets 288, 288 on transverse shafts 289, 289, mounted in the side frame members 25, 25 and downwardly therefrom to and around idler sprockets 290, 290 on transverse shafts 291, 291, and are guided to the drive sprockets 54, 54 in vertically spaced relation with respect to the top of the table 12 on rails 293, 293, extending along said table.

The chains 37, 37 are shown as having attachments 295, 295 secured to certain inner links thereof and extending inwardly therefrom, to which are pivotally mounted hangers 296, 296 (see Figures 19 and 20). Opposite aligned hangers 296, 296 have widened lower end portions which form supports for parallel spaced transverse shafts 297 and 299. The shafts 297 and 299 are shown as having rollers 300, 300 journaled on their opposite ends riding within a guide track 301 spaced beneath the lower rails 293, 293 and extending therealong, for supporting the shafts 297 and 299 during travel of the clamp and pusher member 39 along the top of the table 12. During return travel of the clamp and pusher members 39, 39 from the sprockets 284, 284 to the entering end of the machine, the rollers 300, 300 ride along the upper surfaces of guides 303, 303 shown as being spaced above and extending along the rails 287, 287 for the chains 37, 37.

Each clamping and pusher member 39 carried between the endless chains 37, 37 on the shafts 297 and 299 is shown as being in the form of an angle with the horizontal leg thereof slidable along the top of the table 12, and the vertical leg thereof secured to spaced guide bars 302, 302 secured to and extending inwardly from support plates 305, 305, mounted on and carried by the transverse shafts 297 and 299.

Pivotally mounted on the transverse shaft 297 between each pair of plates 305, 305 is a support member 309. The support member 309 is shown as extending upwardly and forwardly from the shaft 297 over the shaft 299 to a position adjacent the forward end portion of the plates 305, 305 and rearwardly of the vertical leg and lower engaging bar 304. The support member 309 is shown as having a lug 310 depending therefrom intermediate its ends for engagement with a cam 311, shown as being keyed on the shaft 299. Springs 312, 312 connected between the bottom of the plates 305, 305 and the member 304 are provided to bias the lug 310 in engagement with the cam 311.

The forward end portion of the support member 309 is shown as being recessed to receive spaced heads 313, 313 of a depending threaded rod 314. Transverse pins 314, 314 extend into the recess of the support member 309 and engage between the spaced heads 313, 313 and form a trunnion support for said heads on the support member 309. The threaded rod 314 is shown as being threaded within a rearwardly projecting boss portion 315 of a support member 316, for a clamping bar 317 and guided between the guide bars 302, 302. A lock nut 319 threaded on the rod 313, is provided to lock the bracket 316 in position on said rod. The upper head 313 may be slotted to permit adjustment of the position of the clamping bar 317 with respect to the clamping bar 304 upon loosening of the lock nut 319. The clamping bar 317 is shown as being in the form of an angle with the horizontal leg thereof positioned to come into engagement with the top of the ream and clamp the ream to the horizontal leg of the bar 304 upon release movement of the cam 311.

The plates 305, 305 are shown as being spaced apart by spacing sleeves 322, 322 on bolts 323, 323. The bolt 323 at the advance ends of the plates 305, 305 is shown as forming a support for a bracket 324 having a transverse pusher bar 325 supported thereby. As herein shown, the pusher bar 325 has a forwardly extending generally horizontal lip 326 engaging the wrapper on the top of the ream for holding the same down.

The cams 311, 311 are operated to release the clamping bar 317 from the ream by means of a crank arm 327, shown as being keyed to the transverse shaft 299. A follower roller 329 is on the outer end of the crank arm 327. Said follower is engageable with a spaced cam 330 shown as being mounted on the inside of the right hand side frame member 25, and a second spaced cam 331, shown as being mounted on the frame of the machine in advance of the cam 330. Engagement of the roller 329 with the cams 330 or 331 will pivot the shaft 299 and cams 311, 311 in a counterclockwise direction and move the cams 311, 311 in a direction to lift the lugs 310, 310 and support members 309, 309 and open the clamping bar 317 with respect to the bar 304. When in this open position, the pusher 17 may push the leading end of a partially wrapped ream into engagement with the vertical legs of said clamping bars. The roller 29 moving beyond the cam 330 will then release the cam 311, the springs 312, 312 grippingly engaging the clamping bar 317 with the top of the ream. The cam 331 serves to release the clamping bar 317 from the ream.

The level of table 12 at the entering end of the machine is shown in Figure 21 as being in alignment with the upper surface of the horizontal leg of the lower clamping bar 304, to accommodate the ream to be pushed by the pusher directly along said leg without wrinkling or tearing the wrapper. The remainder of the table is on the level of the bottom of horizontal leg of the bar 304.

The conveyor chains 37, 37 are continuously driven during operation of the machine, and travel of the spaced clamping and pushing members 39, 39 controls operation of the pusher 17, to assure a clamping bar 317 is in position to receive a ream and to clampingly engage the ream at the end of the stroke of the pusher 17. As herein shown a limit switch 262 is provided on the upper rail 287 for the conveyor chain 37 and is operated by engagement with a pusher 39 to close a circuit to time operation of the pusher 17 so that when the clamping bar 304 comes into engagement with the top of the table 12, the advance end of the ream with the paper wrapper partially formed thereon, will be moved into engagement with the clamping bars 304 and 317. At this time the roller 329 on the crank arm 327 will have passed to the release end of the cam 330, and the clamping bar 317 will be released, to clampingly engage the wrapper and leading end of the ream and form the wrapper thereover and at the same time pull the partially wrapped ream to an end folding station.

*Trailing end folding station*

Figure 23:
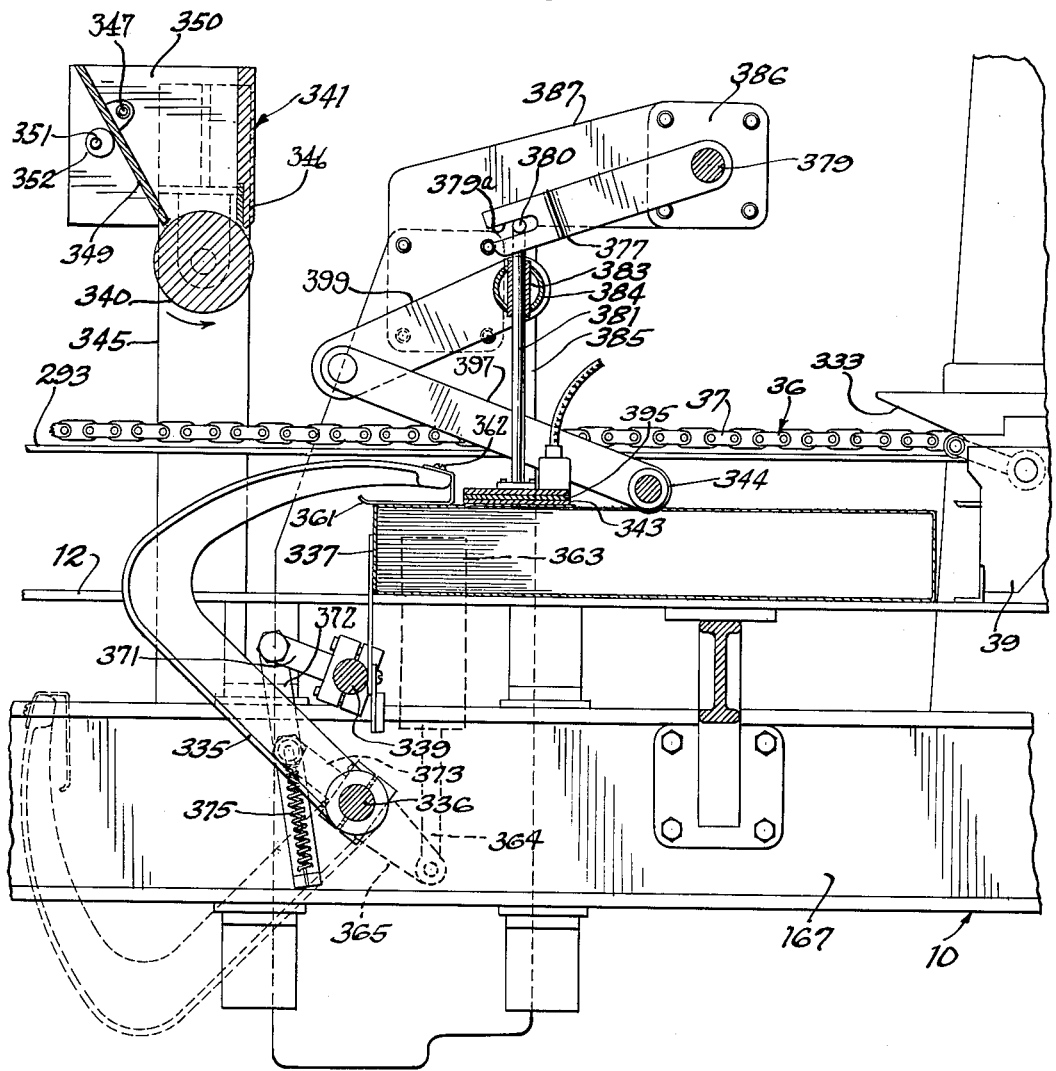
Figure 23 is an enlarged fragmentary longitudinal sectional view taken through the machine, showing the folding arms for wiping the trailing edge of the wrapper along the glue roller and folding the wrapper over the trailing end of the ream, and the pressure bar sealing the overlapping glued edge of the wrapper to the leading end thereof.

The trailing end folding station, for folding the trailing end of the wrapper drawn from the lower chute 16 by the ream as it is pushed and pulled along the table 12, is shown in Figure 23 as including a plurality of laterally spaced end folding arms 335, 335 mounted on a transverse rock shaft 336 journaled in standards 385, 385 beneath the top of the table 12. A plurality of retaining fingers 337, 337, mounted on a transverse rock shaft 339 disposed above the rock shaft 336 and operated thereby are also provided to retain the wrapper to the trailing end of the ream. A transverse glue roller 340 and reservoir 341 for supplying glue thereto and in position to be contacted by the end of the wrapper by the folding arms 335, 335 is provided to apply glue to the trailing end of the wrapper. A pressure pad 343 also presses the overlapping ends of the wrapper to the ream and sets the glue. A smoother roller 344 engaging the wrapper on the top surface of the ream is also provided to draw the wrapper along the ream and smooth the same during travel of the ream to its end folding station.

The glue roller 340 is shown as being journaled at its ends in upright support standards 345, 345 extending upwardly from the channels 167, 167, above the top of the table 12 on the outer sides of the conveyor chains 37, 37 and as driven from a motor 353, mounted on the outside of a channel 267 (see Figure 3). The drive from said motor to the glue roller 340 is through a speed reducer and chain and sprocket drive indicated generally by reference character 355.

The reservoir or glue pot 341 is likewise mounted on the support standards 345, 345 and may be an integral assembly with the glue roller 340, to enable ready removal of the roller and reservoir as a unit at the end of a folding operation to accommodate the reservoir and roller to readily be cleaned.

As herein shown the reservoir 341 includes an advance end wall 346 at the advance end of the roller 340. The wall 346 is spaced above the roller 340, to accommodate rotation of said roller into said reservoir in a direction which in Figure 23 is a counterclockwise direction and to avoid scraping of glue from the roller. The reservoir 341 likewise includes an opposite or forward end wall 349 extending for substantially the length of the roller 340. The wall 349 may be pivoted to side walls 350, 350 of said reservoir on pivot pins 347, 347, to adjust the spacing of the lower end of the wall 349 from the surface of the roller and govern the thickness of the coating of glue on said roller. As herein shown, a rod 351 is mounted in the side walls 350, 350 and has a cam 352 thereon, which may be turned to adjust the end wall 349 with respect to the periphery of the roller.

It should here be understood that during operation of the machine the glue roller 340 is continuously rotating and taking glue from the reservoir 341 and returning the unused glue thereto, and that the amount of glue supplied to the roller 340 is just sufficient to glue the inside of the trailing end of the wrapper.

The motor 353 is started at the initiation of the operation of starting the machine, and is continuously driven during the entire operation of the machine to maintain the roller 340 coated with glue and to prevent the dripping of glue from said roller or the reservoir 341.

The end folding arms 335, 335 are shown in Figure 23 as being of a generally scythe like or V-shaped formation in end view and as being pivoted from the dotted line position shown in this figure beneath the top of the table 12 upwardly through parallel spaced slots 360, 360 extending along said table into engagement with the trailing end of the wrapper, to wipe the inside of the trailing end of the wrapper along the rotating glue roller 340 and then fold the wrapper over the trailing edge and top of the ream into engagement with the underlapping leading end of the wrapper.

The end folding arms 335, 335 are shown as having resilient engaging end portions extending along the inner sides thereof, which may be spring steel strips 361 spaced from the inner sides of said end folding arms. As herein shown, a resilient engaging strip 361 is secured to the outer side of the end of each arm 335 as by a machine screw 362. The strip is bent to extend beyond the end of the arm in an inward direction toward the shaft 336, and has a second bend positioning it along and parallel with the arm so as to be generally parallel to the top of the table 12 when the arm 335 is in its extreme upward position of movement and is in position to engage the wrapper with the ream.

The rock shaft 336 is shown as being rocked to positively move the arms 335 upwardly to fold the trailing end of the wrapper over the trailing end of the ream by means of a fluid pressure cylinder 363 having a piston (not shown) movable therein. As herein shown, the cylinder 363 is mounted on the left hand side of the machine and has a piston rod 364 extensible therefrom, having pivotal connection with a crank arm 365 on the left hand end of the transverse rock shaft 336. The admission of fluid under pressure to the head and piston rod ends of the cylinder 363 may be controlled by individual solenoid operated valves (not shown) one of which may be controlled by a limit switch 369 located in position to be engaged by the ream when in the end folding position shown in Figure 23. This will effect the admission of fluid under pressure to the head end of the cylinder 363 and movement of the arms 335, 335 in a folding direction. A second limit switch 370 controls energization of the other valve (not shown) to supply fluid under pressure to the piston rod end of the cylinder 363 and return the end folding arms 335 to the dotted line position shown in Figure 22. The limit switch 370 is located along the rail 293 and is engaged by a clamp and pusher member 39 to energize the solenoid for said other valve.

The retaining fingers 337 on the rock shaft 339 are shown as being operated by a crank arm 371 secured to said rock shaft and having a link 372 secured thereto and depending therefrom. The link 372 in turn is connected with a crank arm 373 keyed or otherwise secured to the rock shaft 336 through a tension spring 375. Thus upon upward rocking movement of the crank arm 373 the smoothing fingers 337 will move upwardly about the axis of the shaft 339 through the tension spring 375 and come into engagement with the wrapper wrapped around the trailing end of the ream and firmly retain the wrapper to the trailing edge of the ream by the pressure of the spring 375 and smooth and hold the wrapper thereagainst. It should here be noted that the crank arm 373 is longer than the crank arm 371 and that the spring and linkage connection between the two crank arms is such that the fingers 337 will engage the trailing edge of the wrapper and ream prior to engagement of the resilient strips 361 therewith, and will be resiliently maintained in engagement with the ream by the tension spring 375, which is under tension during upward pivotal movement of the fingers 337 and increases in tension as said fingers are engaged with the wrapper, wrapped around the trailing end of the ream.

The pressure pad 343 is shown as extending for substantially the full width of the table 12 and as being suspended from a plurality of laterally spaced crank arms 377, 377 mounted on the transverse rock shaft 379. The crank arms 377 are herein shown as having bifurcated forward ends, the furcations of which are slotted as indicated by reference character 379a. The slotted portions 379a of each arm 377 slidably receive transverse pins 380 secured to and extending laterally from opposite sides of the upper end of a depending rod 381, secured at its lower end to the top of the pressure pad 343. The rods 381, 381 are shown as being slidably guided in sleeves 383 mounted in and extending vertically through a hollow transverse bar 384 secured at its ends to upright support standards 385, 385 extending upwardly from opposite sides of the main frame 10 and also forming a support for the shaft 379.

The rock shaft 379 is journaled at its ends in bearing supports 386, 386 shown as being mounted on the ends of outboard support arms 387, 387 secured to and extending upwardly from the support standards 385, 385 toward the discharge end of the machine.

The pressure pad 343 is shown as being raised and lowered by means of a fluid pressure cylinder 389 having a piston (not shown) movable therein and shown in Figure 3 as being mounted on the right hand support standard 385. The cylinder 389 has a piston rod 390 extensible therefrom and pivotally connected with a crank arm 391 keyed or otherwise secured to the right hand end of the transverse shaft 379. The admission of fluid, such as air under pressure to the head and piston rod ends of the cylinder 389 is controlled by a suitable valve (not shown), which may be solenoid operated. As herein shown, a limit switch 394 is mounted on the inside of the right hand support standard for the pressure pad 343 and is tripped by the outer end folding arm 335, as said arm engages the trailing end of the wrapper with the ream to supply fluid under pressure to the piston rod end of the cylinder 389 and move the pressure pad 343 downwardly into engagement with the overlapping ends of the wrapper and hold said ends together until the glue has set.

The pressure pad 343 is herein shown as having a heating element 399 extending along the top thereof. Said heating element may be of any well known form and is herein shown as being a plate type of heating element, of a form well known to those skilled in the art. Current is supplied to the heating element 395 upon the starting of the main drive motors for the machine, and is maintained on said heating element throughout the entire operation of the machine, under the control of suitable push buttons and relays, which need not herein be shown or described, since they form not part of our present invention. The heat generated by the heating element 395 is sufficient to quickly set the glue in the shortest time possible, so the ream may immediately be picked up by the following clamp and pusher member 39 and pushed along the table for the succeeding wrapping operations, as will presently be described.

Raising of the pressure pad 343 from the wrapper and ream is controlled by a limit switch 396 on the machine frame and closed by a clamping and pushing member 39 in advance of the clamping and pushing member pulling the ream to the end folding station. This will operate the control valve (not shown) for the cylinder 389, to admit fluid under pressure to the head end of the cylinder 389 and raise the pressure pad 343 above the ream and release the ream to be pushed by the next succeeding clamp and pusher, for further wrapping operations.

The smoother roller 344 is shown as being rotatably mounted between two spaced arms 397, 397 freely pivoted to stationary arms 399, 399, secured to the bar 384, adjacent the opposite ends thereof and extending therefrom in a downwardly inclined direction toward the entering end of the machine. The smoothing roller 344 engages and moves along the wrapper lying along the top of the ream by gravity and serves to draw and smooth the wrapper over the ream during pulling of the ream for the trailing end folding and gluing operations just described.

It should here be noted that the end folding arms pressure pad 343 and smoothing roller 344 as well as the retaining fingers 337 and the operating shafts 336 and 339 therefor are mounted on the side frame members or standards 385, 385 and that said standards may be vertically adjusted to adjust the position of the end folding arms 335, retaining fingers 337, pressure pad 343 and smoothing roller 344 for various thicknesses of reams being wrapped.

As shown in Figure 3 the standards 385 are adjustably mounted in gibbed guides 400, 400, the gibs of which may be clamped into retaining engagement with the outer faces of the standards 345, 345 by machine screws 401, 401 clamped thereto by a wrench 402 when said standards are at the proper elevation.

The standards 385 may be vertically adjusted by racks and pinions (not shown) operated by a hand wheel 405, or in any other desired manner.

*Tuckers*

As the ream is being pulled to the end folding station, and during the end folding operation, two laterally spaced reciprocably movable tucking brushes 410, 410 come into operation to tuck the overhanging front edges of the wrapper along the opposite sides of the ream. The same brushes also serve to tuck the overhanging rear edges of the wrapper inwardly along the opposite sides of the ream when the clamping bars 304 and 317 are disengaged from the ream and the ream is being pushed for side folding.

Figure 4:
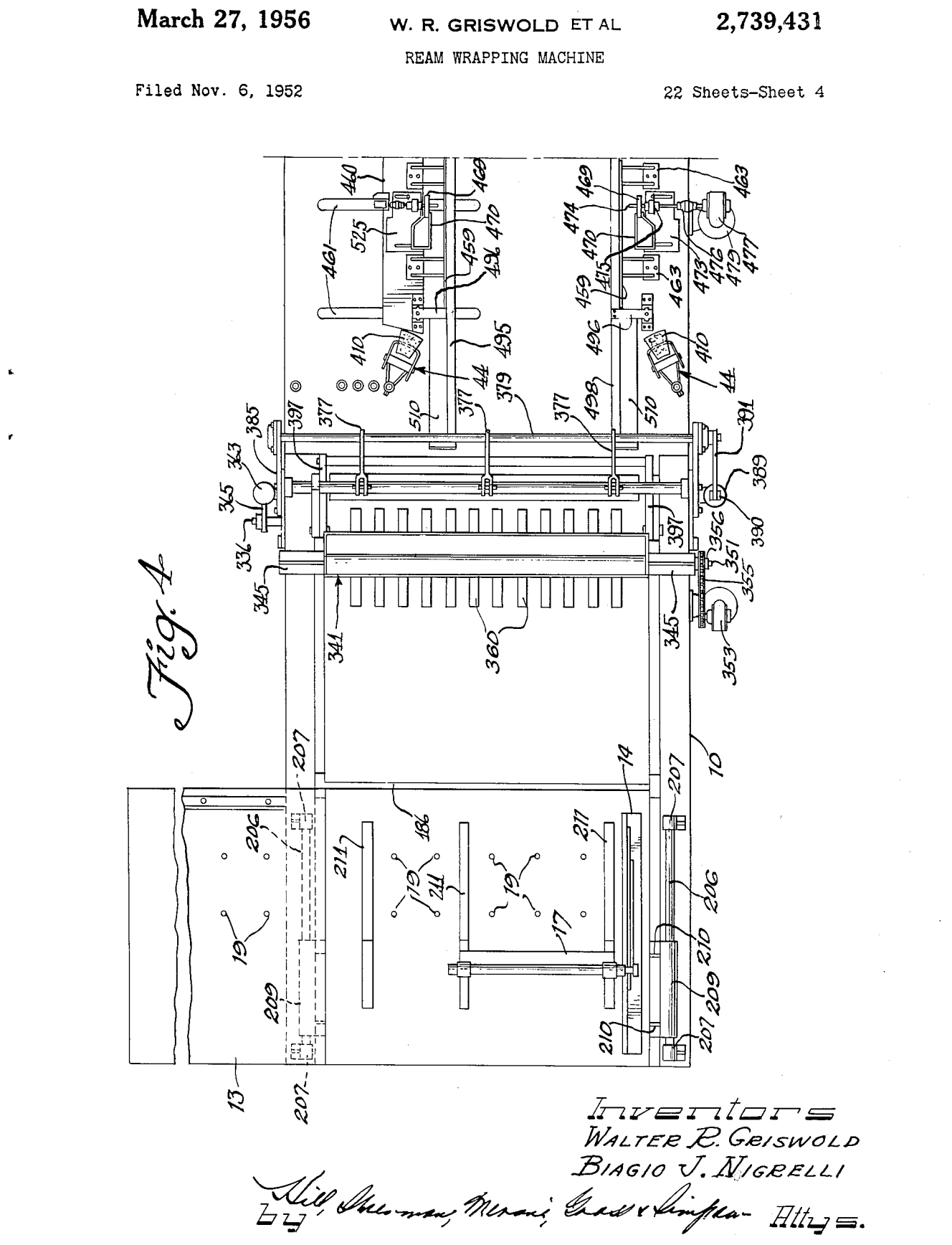

The tucking brushes 410, 410 are shown as being spaced along the table 12 in advance of the pressure pad 343 on opposite sides of the path of travel of the ream along the table (see Figure 4). Each tucking brush 410 is herein shown as being rectangular in cross section, although said brushes need not be rectangular, but may be of any form which will engage the overlapping forward edge of the wrapper and tuck it inwardly along the ream without marring the wrapper. Each tucking brush 410 is mounted on the inner end of an oscillating arm 411 mounted on the upper end of a vertical oscillating shaft 412 and oscillatably driven thereby. As shown in Figure 24 the oscillating shaft 412 on the right hand side of the machine fits within a socketed drive member 413, journaled in a housing and bearing support member 414, mounted on the upper flange of a channel 167, and extending therethrough. A spur pinion 415 is shown as being mounted on the lower end of the socketed drive member 413. The pinion 415 meshes with a transverse rack 416 reciprocably guided beneath the table 12 for movement transversely thereof in spaced support members 419 and 420, shown as depending from a cross frame member 421, connected between the channels 167, 167.

The oscillatable drive shaft 412 for the opposite tucking brush 410 may be inserted within and driven from one of a plurality of laterally spaced socketed drive members 423, 423, shown as being journaled in a housing 424, which may be a part of the cross frame member 421. Spur pinions 425, 425 are shown as being keyed or otherwise secured to the lower ends of the socketed drive members 423, 423 and as meshing with a reciprocably movable transverse rack 426, supported and guided in depending support and guide members 429 and 430.

It should here be noted that the teeth of the rack 416 face oppositely from the teeth of the rack 426 to effect a drive to the two tucking brushes 410, 410 to first move the two brushes toward the entering end of the machine and simultaneously tuck opposite front edges of the wrapper along the opposite sides of the ream and then simultaneously tuck the opposite rear edges of the wrapper along the opposite sides of the ream.

The racks 416 and 426 are simultaneously reciprocated by means of a rotating disk 427, mounted on the upper end of a vertical shaft 429, journaled in a housing 430, shown as being secured to and depending from the cross frame member 421. The rotating disk 427 is shown as having a crank pin 431 secured thereto and extending upwardly therefrom, on which are journaled the adjacent ends of drive links 432, and 433. The link 432 is shown as extending within a slotted inner end portion of the rack 416 and, as being pivotally connected thereto by a vertical pin 434. The link 433 extends within a slotted inner end portion of the rack 426 and is pivotally connected thereto as by vertical pivot pin 435. The shaft 429 is shown as having a bevel gear 437, keyed to the lower end thereof and meshing with and driven from a bevel pinion 439 journaled on its hub within the housing 430 and having a transverse drive shaft 440 secured thereto and extending outwardly therefrom, to the right hand side of the machine. The shaft 440 is journaled at its outer end in a bearing support member 441, shown as being secured to the outside of the channel 167 and depending therefrom.

The shaft 440 is shown as having a solenoid operated clutch 443 mounted thereon for driving the same. The clutch 443 is shown as being driven from a sprocket 444 keyed thereto and meshed with and driven from an endless drive chain 445 driven from a sprocket 446 on the inner end of a transverse shaft 447 of a speed reducer 449. The speed reducer 449 may be of any well known form, and is shown as being driven from the motor 45 through the longitudinal drive shaft 46. (See Figure 3.)

The clutch 443 may be operated upon the energization of a solenoid 450, in a well known manner, upon the closing of a limit switch 451. The limit switch 451 is mounted beneath the table 12 and has an arm (not shown) extending upwardly through the table top to be operated by the ream being wrapped. Engagement of the limit switch 451 with the ream will close a circuit to the solenoid 450 and engage the clutch 443 and drive the shaft 440 and disk 427, to move the tucking brushes 410, 410 about the axes of the shafts 412, 412 toward the entering end of the machine and tuck the overlapping advance edges of the wrapper inwardly along the opposite sides of the ream. Rotation of the disk 427 and pivotal movement of the tucking brushes 410, 410 will then stop. This is attained by the tripping of a limit switch 453, de-energizing the solenoid 450, and closing a circuit through a limit switch 451 engaged by and held open by the ream 18.

The limit switch 453 is shown as being mounted on a bracket 454 secured to and depending from the cross frame member 421, adjacent the housing 430. The limit switch 453 has an operating arm 455 having a roller 466 on the end thereof, tripping said switch when the roller 466 rides along a raised cam surface 457 formed on the periphery of the disk 427.

*Side folding and gluing*

The pusher plate 325 on the clamp and pusher member 39 next succeeding the clamp and pusher member pulling the ream to the end folding station engages and pushes the ream through the tucking station into the side folding station where the overlapping upper flaps of the wrapper are first folded downwardly and the lower flaps of the wrapper have glue applied thereto and are then folded upwardly.

Figure 4A:
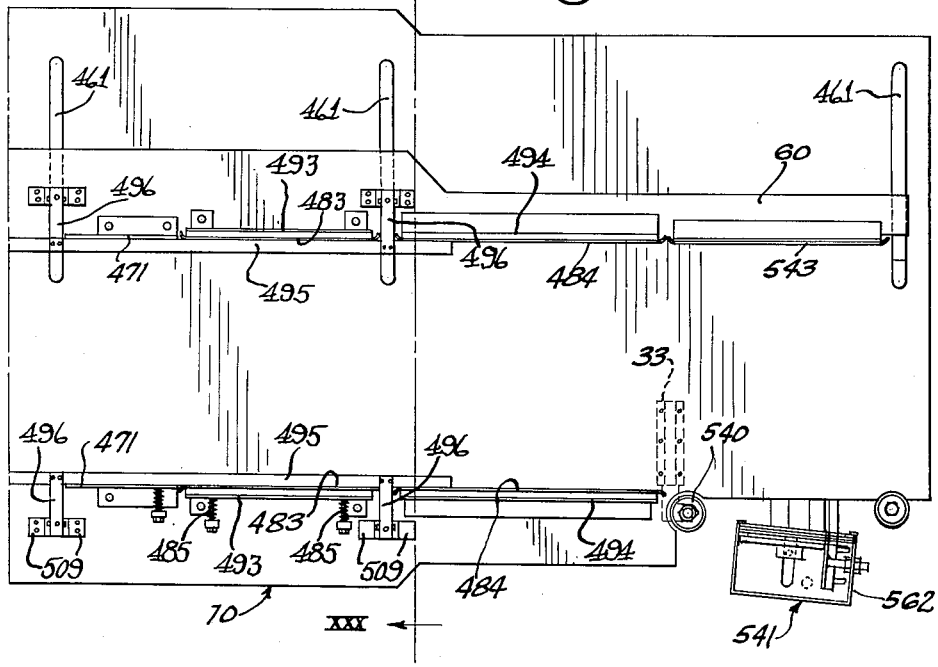
Figure 4a is a plan view of a rear continuation of the machine shown in Figure 1.
Figure 35:
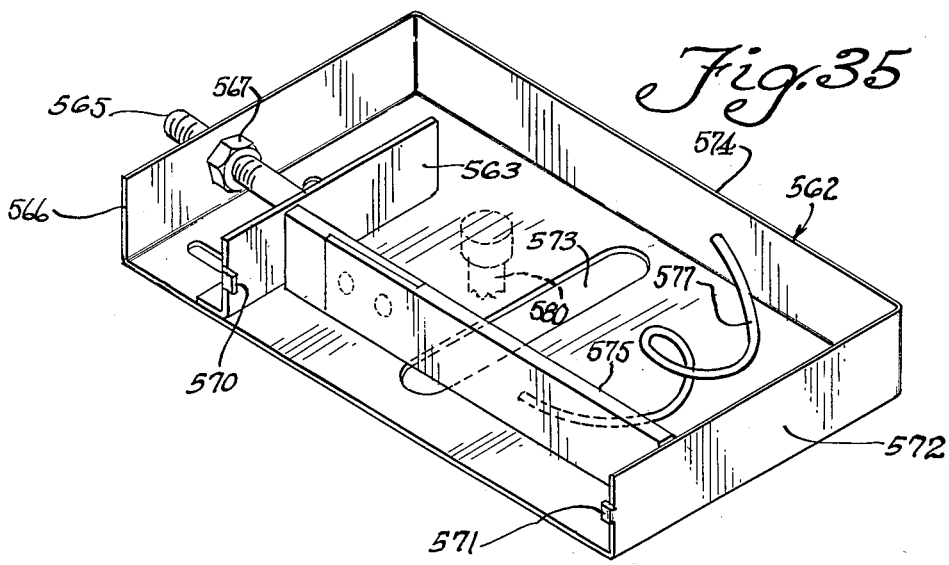
Figure 35 is a perspective view illustrating the labeler container.
Figure 8:
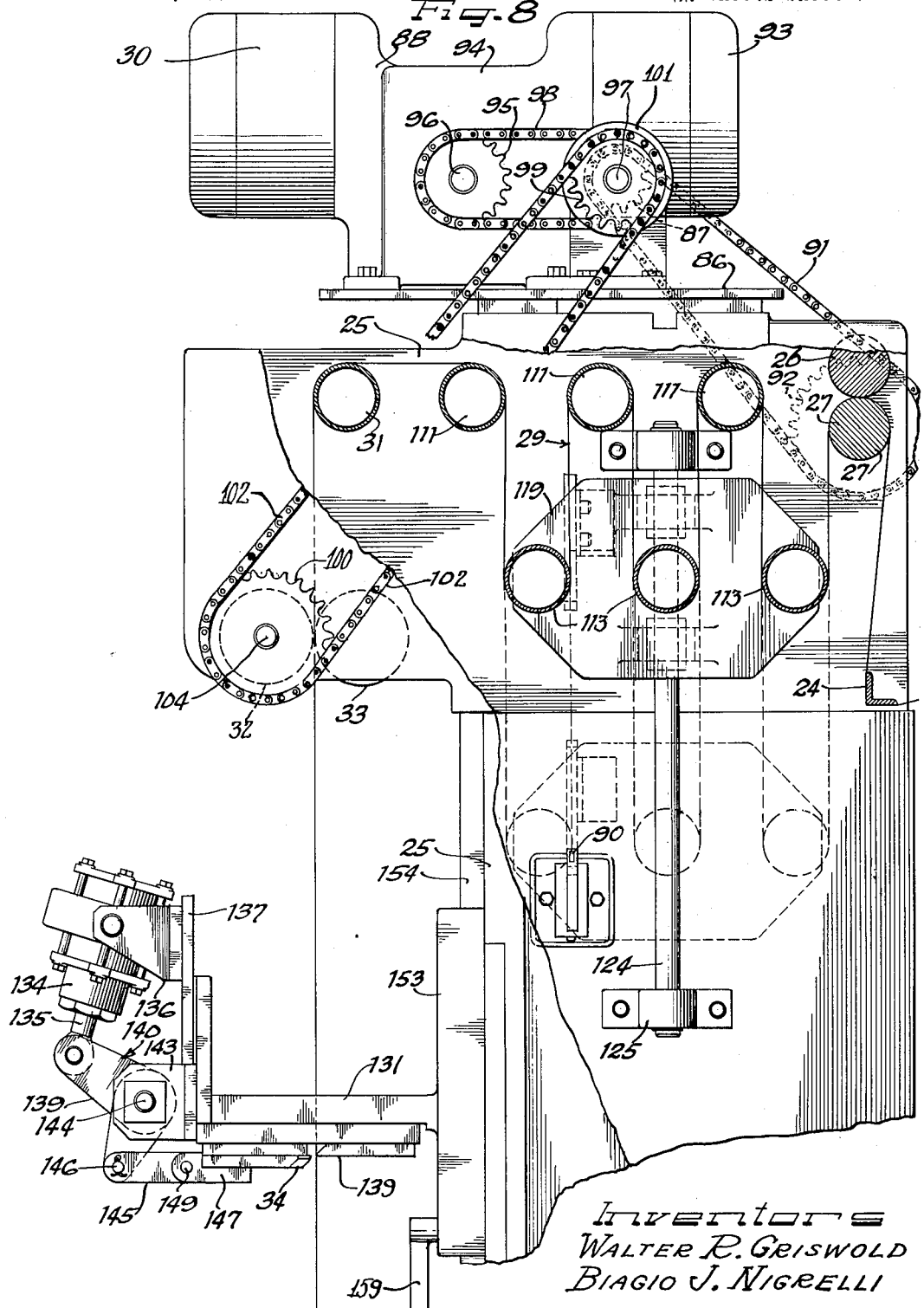
Figure 8 is an enlarged fragmentary view in side elevation of the upper forward end portion of the machine, illustrating the festoon, storing the paper for wrapping, the rolls supplying paper to the festoon and taking paper from the festoon for wrapping, and the shearing knife for shearing the paper to wrapper length.

As shown in Figures 4, 4a and 26 through 30, a side folding plow 459 extends along each side of the path of travel of the ream along the table 12. The side folding plow 459 on the right hand side of the machine, is shown as being fixed, while the side folding plow 459 on the left hand side of the machine is shown as being laterally adjustable to accommodate the side folding of reams of various widths. As shown in Figures 4 and 4a the side folding plow 459 on the left hand side of the machine is mounted on a plate 460, laterally adjustable along transverse slots 461, 461 and extending from the tucking brushes 410 to the discharge end of the machine.

The side folding plow 459 on the right hand side of the machine is shown as being supported on spaced brackets or support members 463, 463, mounted on spacer plates 464, 464 spaced outwardly from said plow and mounted on the top of the table 12. The spacer plates 464, 464 are provided to space the under surface of the plow above the top of the table a distance sufficient to accommodate the unfolded lower laterally projecting flap of the wrapper to pass thereunder. As shown in Figure 26, the plow 459 has a relatively long inclined under surface 465, inclined downwardly from the entering end of the plow and of sufficient height to wrap reams of various thicknesses, without adjustment of the plow. Along the edge of the inclined folding surface 465 extends an outwardly and downwardly curled plate portion 466, which may be a continuation of the inclined edge 465, and which serves to deflect any misaligned reams inwardly along the inner surface of the plow, to prevent fouling of the ream on the inclined under folding surface of the plow.

Each plow 459 is likewise shown as having an outwardly extending creasing shoe 467, having an advance end portion curled upwardly to engage and crease the inwardly tucked end portions of the lower flap of the wrapper. As herein shown the bottom of creasing shoe 467 is in alignment with the bottom surface of the plow to engage and crease the lower unfolded flap of the wrapper as it passes thereby.

Intermediate the brackets 463, 463 for each plow, and in advance of the creasing member 467 is a glue roller 469. The glue roller 469 is shown as being movable within a glue box 470 and is positioned to engage the upper side of the lower flap of the wrapper as it passes thereby and apply glue thereto prior to upward folding movement thereof by an advance folding plow 471 (see Figure 4). Each glue box 470 is shown as having a reduced advance end portion, open to receive the glue roller 469.

The glue box 470 and roller 469 on the right hand side of the machine are shown as being mounted on a plate 473, mounted on the top of the table 12 for lateral adjustable movement with respect thereto to afford adjustment of the box and glue roller for varying lengths of flaps, dependent upon the height of ream being wrapped.

The glue roller 469 is mounted on a shaft 474 for movement therealong in accordance with the position of adjustment of the plate 473. The shaft is journaled in a bearing member 475 mounted on the plate 473. A coupling 476 connects said shaft with a speed reducer 477 driven from a motor 479 mounted on the right hand side of the frame 10.

The motor 479 is started upon the starting of the main drive motors for the machine, to assure a coating of glue on the roller and to prevent glue from dropping onto the top of the table 12.

The glue roller 469, glue box 470 and support plate therefor on the left hand side of the machine is shown as being mounted on a plate 525 adjustably mounted on the plate 460 for lateral adjustment with respect thereto, to take care of flaps of various lengths for various thicknesses of reams. The roller 469 on the left hand side of the machine is shown as being driven from a gear box 527 which may be a mitre gear box. The gears in the gear box 527 are driven from a vertical shaft 529 extending through a slot 461 and having a pulley 530 secured to its lower end for driving the same. The pulley 530 in turn is shown as being driven from a belt 531, which may be a V-belt, driven from a pulley 532 adjacent the upper end of a vertical shaft 533 of a speed reducer 534 driven from a motor 535. The motor 535 and speed reducer 534 may be supported from a slide 536, connected with the plate 460 through a slot 461 and guided in gibbed guides 537, 537 extending along each side of the slide 536.

In advance of each folding plow 459 and in direct alignment therewith is an up-folding plow 471. The right hand plow 471 is shown as being mounted on the top of the table 12 on a support member 480, shown as being mounted on a spacer plate 481 mounted on the top of the table 12. The left hand plow is mounted on the plate 460. Each folding plow 471 rests directly on the top of the table and has a uniformly inclined folding surface 482 inclined upwardly from an apex at the top of the table. The apex or forward end portion of the plow 471 engages under the creased and glued lower flap of the wrapper and folds the flap upwardly along the plow into engagement with the downwardly folded flap during movement therealong. The right hand folding plow 471 is spring pressed as indicated by reference character 472 in Figure 4a, to press the glued sides of the wrapper together.

In advance of the folding plows 471, 471 are heated pressure plates 483, 483 engaging the folded end flaps during movement of the wrapped ream therealong and setting the glue by heat. The pressure plate 483 on the right hand side of the machine is also shown as being pressed into engagement with the side of the ream by compression springs 485, and presses the ream into engagement with the left hand pressure plate 483. Pressure plates 484, 484 are in alignment with pressure plates 483, 483, to retain the upper and lower flaps together until setting of the glue.

The pressure plates 483, 483 and 484, 484 are shown as having strip heating elements 493, 493 and 494, 494 respectively, mounted on the outer sides thereof for setting the glue on the end flaps of the wrapper by heat.

Spaced inwardly of the folding plows 459, 459, 471, 471 and the pressure plates 483, 483 are hold down strips 495, 495 shown in Figures 4 and 4a as extending from the trailing end folding and gluing station along said plows and pressure plates and partially along the pressure plates 484, 484. The hold down strips 495, are shown as being mounted on the inner ends of spaced resilient arms 496, 496 mounted on the upper ends of threaded shafts 497, 497, extending beneath the top of the table 12 and threaded within threaded sleeves 499, 499 rotatably carried in support plates 500, 500 depending from the bottom of the table 12. The threaded sleeves 499, 499 are shown as having worm gears 501 secured thereto meshing with and driven from worms 503, 503 spaced along longitudinal shafts 504, 504 and driven therefrom. The shaft 504 on the right hand side of the machine is driven by mitre gears 505, one of which is keyed or otherwise secured to said shaft and the other of which is secured to a transverse shaft 506, rotatably journalled in the bearing support member 507 depending from the bottom of the table 12. The outer end of the shaft 506 may be squared to receive a hand crank (not shown) for rotating the same and adjusting the elevation of the pressure strips 495 on the right hand side of the machine in accordance with the thickness of ream being wrapped.

The threaded shafts 497 and resilient support arms 496 on each side of the ream are shown as being guided between upright guide members 509, 509 extending upwardly along each side of said shafts, to hold said shafts from turning movement during vertical adjustment of the strips 495, 495.

It should be noted that the pressure strips 495, 495 at the tucking station have hold down plates 510, 510 extending outwardly therefrom a sufficient distance to engage the upper projecting flaps of the wrapper and hold these flaps down during the operation of tucking the leading and trailing ends of the wrapper.

The hold down strip 495 and hold down plate 510 at the left hand side of the machine, and the support arms 496, shafts 497 and guide member 509 are supported on the plate 460 for lateral adjustment with the plow 459, glue roller 469 and plow 471 as well as the pressure plates 483 and 484. Each threaded shaft 497, extends downwardly from the plate 460 through the slot 461, to accommodate movement of the plate 460 therealong and the support plates 500 on the left hand side of the machine may be secured to the plate 460 through the slots 461, 461. The end of the shaft 515 adjacent the discharge end of the machine is shown as being squared to receive a hand crank (not shown) operable from the discharge end of the machine to vertically adjust the position of the hold down strip 495 and hold down plate 510 on the left hand side of the machine.

The plate 460 is laterally adjusted along the table top 12 to accommodate side folding and gluing of reams of various widths, by means of a plurality of spaced pinions 520, 520 on a longitudinal shaft 521, rotatably supported in bearing plates 522, 522, shown as being secured to depending guide members 523, 523 secured to the plate 460 through the slots 461. The pinions 520, 520 are shown as meshing with spaced racks 523, 523 carried on the bottom of the table 12. The end of the shaft 521 at the discharge end of the machine is rotatably journaled in the end bearing support 517 movable along the discharge end slot 461. The shaft 521 like the shaft 515 is squared to receive a hand crank (not shown). A suitable clamping means (not shown) may be provided to clamp the plate 460 in the desired position of adjustment on top of the table 12.

*Labeler*

At the discharge end of the presser plate 484 on the right hand side of the machine, and mounted for movement into and out of engagement with the folded and glued side of the wrapper, is a moistener roller 540. Spaced from the moistener roller 540 toward the discharge end of the machine is a labeler indicated generally by reference character 541 operable to apply a gummed label to the moistened side of each package as it passes thereby.

Mounted on the plate 260 and forming a continuation of the heated pressure plate 484 is a back up plate 543, facing the labeler 541 and backing up the ream during the label applying operation.

The moistener roller 540 is shown in Figure 33 as being of a porous material, which may be sponge rubber, and as being mounted on a hollow shaft 544 having a plurality of passageways 545 leading from the inner to the outer side thereof, to conduct water to the roll 540, to maintain said roll sufficiently moist to moisten the right hand side of the folded and glued wrapper, prior to the label applying operation.

The hollow shaft 544 is shown as being closed at its upper end and as being threaded to receive a washer 547 and nut 548, to retain the roller 540 to the shaft 544. The shaft 544 has a shouldered lower end portion resting on and supported by a laterally slidable support plate 550, slidably guided beneath the top of the table 12 on gibbed guides 551, 551. A nut 552 on the lower end of said shaft may be provided to retain said shaft and the roll 540 to said support plate. A fitting 553 may be threaded within the end of the shaft 540 and may be connected to a source of supply of water, to conduct water to the hollow interior of the shaft 544.

An arm 555 is shown as depending from the inner end of the support plate 550 and as having a spring 556 attached thereto at one of its ends and to a suitable bracket (not shown) depending from the bottom of the table 12 and spaced inwardly from the arm 555, to bias the moistener roller 540 into position to engage the side of a package moving along the table 12 and moisten the same for the application of a label thereto. A solenoid 557 having an armature 559 is provided to move the moistener roll 540 against the bias of the spring 556 out of engagement with the side of the wrapper, during the application of the label thereto. This is to assure moistening of the side of the package only while passing along the moistener roller 540, and to prevent said moistener roller from wetting the side of the package during the label applying operation, at which time the package is stationary until engaged by the next succeeding package.

The solenoid 557 may be energized by a limit switch 560 located on the table and spaced from the moistener roll 540 toward the labeler 541, and closed by engagement with the package being wrapped, and a second limit switch 561 spaced from the moistener roll 540 toward the entering end of the machine and engaged by a next succeeding clamping bar moving a following package past the side folding station.

The labeler 541 is shown as including a labeler carriage or box 562 having a side guide 563 extending along one side thereof and adjustably mounted therein to take care of varying lengths of labels, for the various reams to be wrapped.

Adjustment of the side guide 563 is effected by means of a threaded rod 565, secured thereto and extending through an adjacent wall 566 of the carriage 562. A nut 567 is shown as being threaded on the inner end of said rod, while a nut (not shown) threaded on the outer end of said rod may be provided to effect adjustment of the side guide 563 in accordance with the lengths of the label to be used. The side guide 563 is shown as having an inwardly extending clip 570 extending a slight distance inwardly therefrom, to engage the edge only of the outer label in said carriage. The opposite edge of the label is engaged and retained in the carriage by means of a similar clip 571 secured to and extending inwardly from an opposite wall 572 of the carriage 562.

The carriage 562 is also shown as having a slot 573 extending along its bottom toward an outer wall 574 thereof and transversely of the table 12. A back up plate 575 extends along the carriage 561 in the space between the side guide 563 and the wall 572 thereof and is mounted on a vertical pin 576 extending loosely through the slot 573. The back up plate 575 is provided to engage an inner label of a stack of labels to maintain the labels in engagement with the clips 570 and 571. The carriage 562 is shown as being slidably supported on a support plate 577 having the pin 576 extending therethrough and secured thereto. It should here be noted that the slot 573 is relatively wide and long compared with the diameter of the pin 576, to accommodate freedom of movement of the carriage with respect to said slot. A torsion spring 577 may be interposed between the back or outer wall 574 of the carriage and the back up plate 575 to bias said plate into engagement with the end label of the stack of labels.

The carriage 562 is likewise shown as having a pivot pin 580 depending from the bottom thereof and located toward the rear end thereof and toward the side guide 563. The depending pin 580 is shown as extending through and as being mounted on a block 581 on the outer end of a slidably guided rod 583. The rod 583 is shown as being slidably guided in spaced supports 584, 584 depending from a plate 585 secured to the bottom of the table 12. The rod 583 and pin 580 are shown as being biased outwardly of the table 12 by a tension spring 586, secured to a hanger 587 secured to and depending from the outer support 584 at one of its ends and secured to a hanger 587 at its opposite end. The hanger 587 is shown as being of a substantial inverted L-shaped form with the spring 586 hooked to the end of the leg thereof. The base of the L is shown as being turned at right angles to extend parallel to the leg of the L and as abutting the end of the rod 583 and secured thereto as by machine screw 588.

A tension spring 589 is shown as being connected to the opposite side of the carriage 561 from the tension spring 586, to normally bias said end of said carriage toward the table 12 and thus bias said carriage in the inclined position shown in Figure 2b. The spring 589 is shown as being connected to the depending leg of an angle 590 secured to the bottom of the carriage 561 and depending therefrom. The opposite end of the tension spring 589 is connected to a suitable hanger (not shown), secured to and depending from the bottom of the table 12. The carriage 561 is moved inwardly toward the table 12 to apply a label to the side of a package in registry therewith, by means of a fluid pressure cylinder 591 having a piston (not shown) movable therein. The cylinder 591 is shown as being a double acting cylinder and as having a piston rod 592 extensible therefrom. The piston rod 592 is shown as being slotted at its outer end to receive a tongue 593 depending from a slide 594, having the plate 576 and pin 574 secured thereto and moved thereby.

The slide 594 is shown as being of a generally T-shaped form, guided in shouldered guides 595, 595 and retained therein by gibs 596, 596, secured to the bottom thereof and extending inwardly along the bottom of the cross of the T. The slide 594 is likewise shown as having a block 597 extending upwardly from the cross of the T between the guides 595, 595, on which the pin 576 and plate 577 are mounted.

Upon the admission of fluid under pressure to the piston rod end of the cylinder 591 the plate 579 and back up plate 575 will be advanced toward the edge of the table 12 with the leading edge of the wall 572 of the carriage 561 in advance of the wall 566 and with the carriage inclined outwardly with respect to the edge of the table 12 from the wall 572. Further movement of the piston rod 592 will engage the advance edge of the outer gummed label in the carriage 561 with the moistened folded and glued side of the wrapper, adjacent the trailing end of the wrapper, and will pivot or rock the carriage and label against the tension spring 586, to wipe the label along the side of the wrapper with a rolling action. It should here by understood that the label applying operation is substantially instantaneous and is effected after the pusher plate of a clamp and pusher 39 has left the package and started on its return travel and that the package is stationary during this operation until engaged by the next succeeding package.

Fluid under pressure, such as air may be supplied to and released from the head and piston rod ends of the cylinder 591 by means of a suitable air valve (not shown) which may be solenoid operated and controlled by the limit switches 560 and 561, which also energize the solenoid 557, to withdraw the moistener roller 540 from the package at the same time the carriage moves inwardly toward the package, to apply a label thereto.

The limit switches 560 and 561 are so arranged that when the next succeeding ream closes the limit switch 560, the solenoid (not shown) controlling operation of the valve (not shown) for operating the cylinder 591 will first be energized to supply fluid under pressure to the piston rod end of said cylinder and when the ream engages the limit switch 599 the solenoid just mentioned will be de-energized and the limit switch will connect a second solenoid (not shown) to operate the valve to supply fluid under pressure to the head end of the cylinder 591.

*Operation*

In the operation of the machine, the heater 395 in the pressure pan 343 and the side heaters 493, 493, 494, 494 may first be turned on, to assure a proper temperature to set the glue during packaging of the ream. A roll of wrapping paper 21 may then be placed in position on the support standards 23, 23 and aligned with the festoon feed rolls 26 and 27. The paper may be trained from the top of the roll 21 downwardly toward the advance end of the machine under a breaker bar 24, upwardly between the nip of the festoon feed rolls 26 and 27. The wrapping paper may then be trained through the rolls 111, 111 and 113, 113 of the festoon 29 and downwardly between the paper feed rolls 32 and 33 into the guide chute 15.

Figure 2:
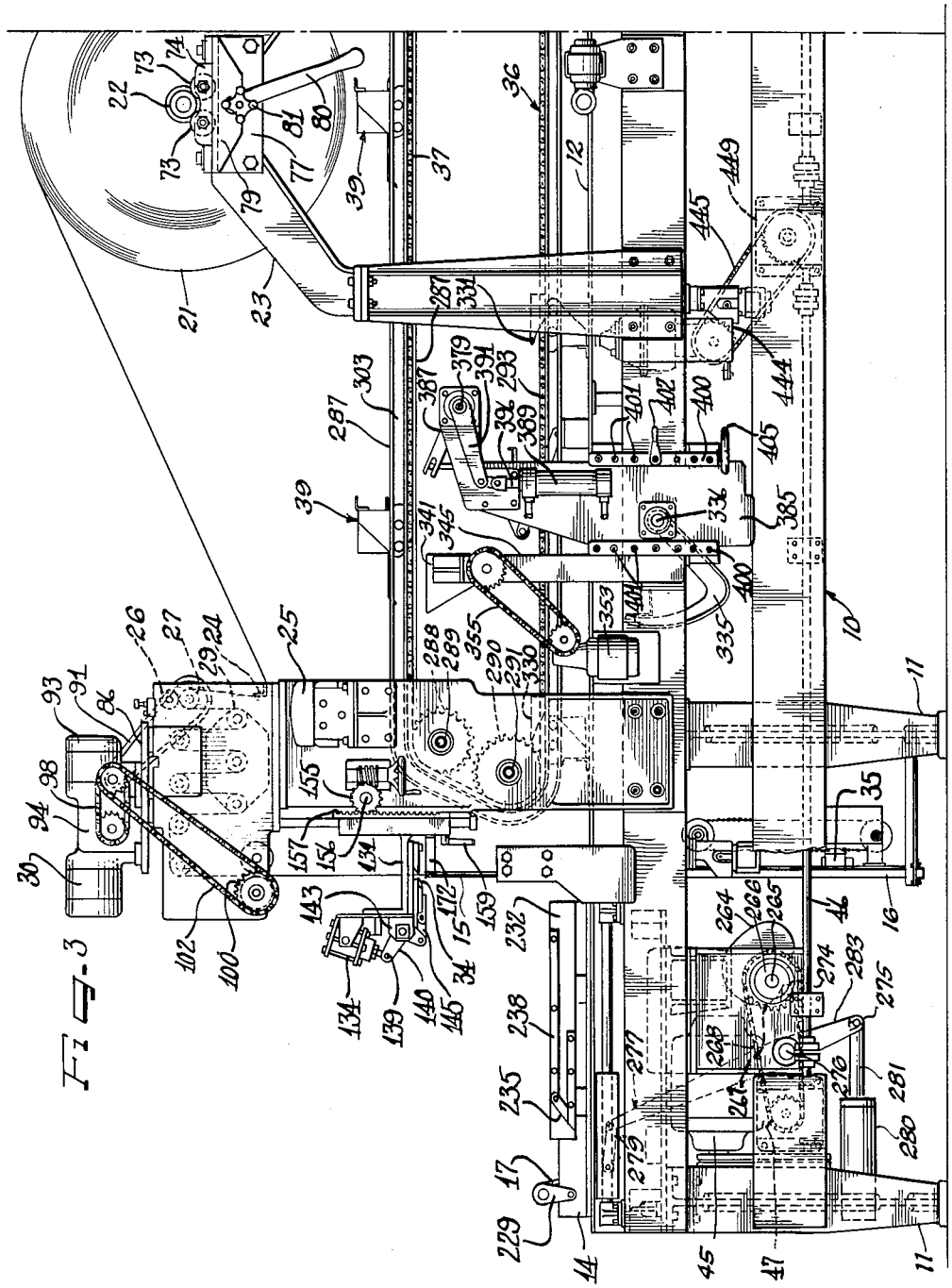
Figure 2 is a view in side elevation of the machine shown in Figure 1.

The end gluing motors and side gluing motors may next be started. The paper feed motor and festoon feed motor may then be started. The main drive motor 45 may next be started to drive the conveyor 36 and clamping bars and pushers 39 carried thereby, and start the timing of the sequence of operation of the pusher 17 by closing the limit switch 262 on the rail 287, as shown in Figure 2.

The magnetic clutch 101 may then be energized to effect a drive to the paper feed rolls 32 and 33 and feed paper into the chutes 15 and 16. When paper of wrapper length has been fed into the chutes 15 and 16, the limit switch 35 opens, to stop the paper feed. A main circuit is then completed to operate the knife 34 to shear the paper to length, by the admission of fluid under pressure to the head end of the cylinder 134 under control of the limit switch 152 on the knife support.

Assuming the machine has been adjusted for the size of ream to be wrapped, and the glue potts 341 and 470 are filled, the operator may then place a ream on the extension 13 of the table 12 and move the ream thereover into engagement with the side guide 14 and pusher 17. This will effect closing of the limit switches 245 and 246 by engagement with the edge of the ream. A clamping and push bar 39 continuously traveling over the table 12 in the orbit of chains 37, 37 may then operate the limit switch 262 on the rail 287. This will close the circuit to the one revolution clutch 269 and effect rotation of the cam 266 to operate the pusher 17 to grip and push the ream forwardly along the table 12, and pick up the wrapper in the space between the chutes 15 and 16 (see Figure 36a). The pusher 17 will then push the ream into the wrapper, forming the wrapper to the leading end thereof, and into engagement with the clamping bars 304 and 317, traveling along the table 12 toward the discharge end of the machine.

As the ream is moved to pick up the wrapper, the hold down shoe 249 comes into engagement with the advance upper edge portion of the ream, to hold the sheets of the ream down when picking up the wrapper. As the roller 329 on the end of the crank arm 327, engaging the cam 330 to open the clamping bars 304 and 317, moves out of engagement with said cam 330, the clamping bar 317 will be released. The ream is pushed into engagement with the clamping bars 304 and 317 when opened. Then upon release of the bar 317, springs 312, 312 will then engage the bar 317 with the ream and complete the forming of the wrapper to the leading end of the ream, and pull the ream and wrapper along the table 12 to effect the first wrapping operation shown in Figure 36b.

The pusher 17 may then be returned by mechanical operation of its air valve (not shown), operated when the cage 205 reaches the end of its pushing stroke.

The ream is then carried forwardly by the clamping bars 304 and 317. Upon engagement of the ream with a limit switch 600 located under the table 12 and having an operating arm (not shown) extending through the top of the table in position to be engaged by the ream, to be closed thereby, the circuit to the paper feed clutch 101 will be completed, effecting the feed of paper into the guide chutes 15 and 16 until engagement of the leading edge of the paper with the limit switch 35. The knife 34 will then come into operation to shear the next wrapper to length.

As the paper feed rolls 32 and 33 feed the next wrapper along the guide chutes 15 and 16, the festoon rolls 113, 113 will be raised, releasing the festoon carriage 119 from the limit switch 90. This will close said switch and effect engagement of the festoon feed clutch, and operation of the festoon feed rolls, to feed paper from the paper roll 21 into the feston until the festoon is full. At this time the carriage 119 will come into engagement with the limit switch 90 and open the same and effect disengagement of the festoon feed clutch, to stop operation of the feed rolls 26 and 27.

As the ream is pulled by the clamping bars 304 and 317 to the trailing end folding station, the ream will operate the limit switch 369, effecting the supply of fluid under pressure to the head end of the cylinder 363, and movement of the trailing end folding arms 335, 335 upwardly into engagement with the wrapper. Upward movement of these arms will contact the inner trailing edge of the wrapper with the glue roll 340 and transfer glue thereto. Further upward movement of the end folding arms 335, 335 will effect folding of the wrapper around the trailing end of the ream into engagement with the top surface thereof and into engagement with the leading end portion of the wrapper lying along the top of the ream. At the same time the smoothing fingers 337, 337 following the arms 335, 335 come into engagement with the wrapper and smooth the same to the trailing end of the ream.

Figure 36:
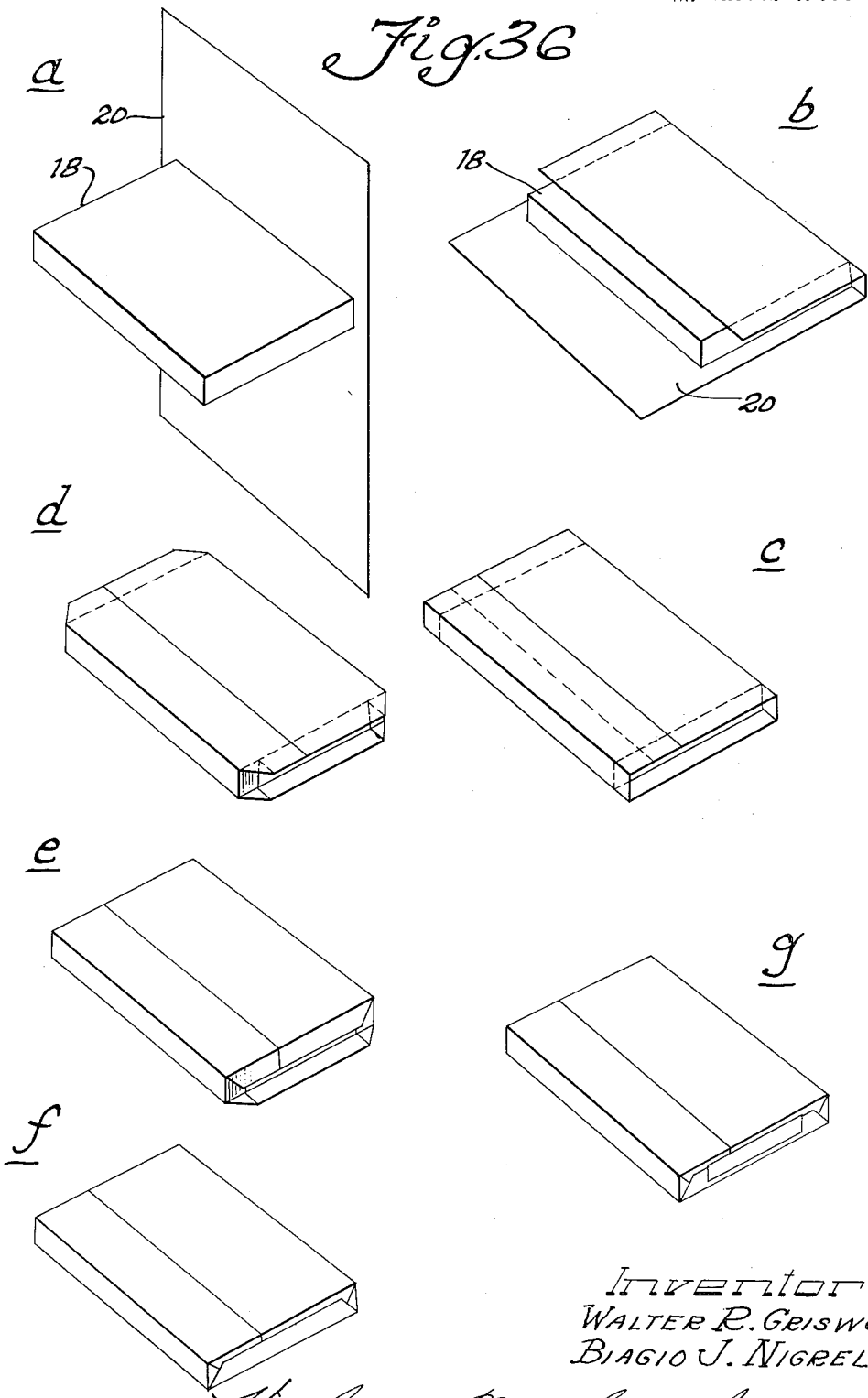
Figure 36 is a series of perspective views illustrating the sequence in which the folding operations are performed by the machine.

The ream when being pulled to the trailing end folding station just described and prior to release of the clamping bars 304 and 317 therefrom, engages and closes a limit switch 451, closing the circuit to the solenoid for operating the clutch 443, to move the tucking brushes 14 into contact with the overlapping front ends of the wrapper and tuck the same inwardly along the sides of the ream into the position shown in Figure 36d. During this operation, the hold down plates 510, 510 resiliently engage the overlapping upper flaps of the wrapper to hold the same down during tucking.

It should be understood here that the front tucking cycle is carried out during pulling of the ream to the trailing end folding station and during movement of the advance end of the ream past the tucking brushes 410, 410 as they move toward the trailing end of the ream. At the end of the front tucking cycle, the cam 457 on the disk 27 will trip the limit switch 453 and deenergize the solenoid 450 operating the clutch 443. The tucking brushes will then stop at the end of the front tucking cycle.

The roller 329 on the crank arm 327 then comes into engagement with the cam 333 spaced along the table from the cam 330 toward the discharge end of the machine, and the clamping bars 304 and 317 open to release the ream.

The end folding arms 335, 335 at the end of their folding cycle engage the limit switch 394, closing the same and energizing a solenoid for operating the valve to supply fluid under pressure to the cylinder 389, to effect engagement of the heated pressure pad 343 with the glued seam of the wrapper, and to hold the pressure pad in engagement with the seam until sealed by the pressure and heat of said pad.

A clamp and pusher 39 of the conveyor 36 movable in advance of the ream then operates the limit switch 370 spaced along the rail 393 from the limit switches 369 and 451 to effect the return of the end folding arms 335. The advance pusher also closes the limit switch 396 on the rail 393 in advance of the limit switch 370 to effect raising of the pressure pad 343.

Upon release of the pressure pad 343 from the ream, and return of the folding arms 335 the next succeeding clamp end pusher member 39 will come into engagement with the trailing end of the ream and push the same along the table 12. As the ream moves beyond the limit switch 451, to release the same, a circuit will be completed to the solenoid 450 to again energize said solenoid and engage the clutch 443, to return the tucking brushes to the position shown in Figure 4, and tuck the rear overlapping edges of the wrapper inwardly along opposite sides of the ream. At the end of the rear tucking cycle, the limit switch 453 is released by movement of the roller 456 off the cam 457, to disengage the solenoid 450 and release the clutch 443, it being understood that the limit switch 453 stops operation of the tucking brushes during each half revolution of the disk 427 and operates in cooperation with the limit switch 451 at the end of one tucking cycle to set up a circuit to complete the next tucking cycle when the ream is in the proper position along the table 12.

The pusher plate 325 of the clamping and pusher member 39 continues to push the ream along the table 12 toward the discharge end thereof, moving the upper flaps of the wrapper into engagement with the side folding plows 459, 459 and folding the same downwardly along the ream (Figure 36e), the lower flaps being creased by the creaser shoes 467, and glue being applied to the lower flaps by the rotating glue rollers 469, 469, during the down folding operation of the upper flaps. The lower flaps of the wrapper may then come into engagement with the upwardly inclined folding surfaces of the forwardly spaced folding plows 471, 471 and be folded upwardly thereby into engagement with the upper flaps (Figure 36f). The wrapped ream continues its travel along the table between the presser and heating plates 483 and 483, pressing the folded side flaps of the wrapper together and setting the glue by heat.

As the packaged ream leaves the heating plates 484, 484 the pusher plate 325 travels upwardly with the chains 37, 37 and leaves the ream. Prior to leaving of the pusher plate 325 from the ream, however, the ream is pushed along the moistener roll 450 into engagement with the limit switch 560, energizing the solenoid 557 to move the moistener roll 540 away from the ream, and energizing the solenoid operating the valve controlling the admission of air to the piston rod end of the cylinder 551, to move the labeler angularly inwardly, to wipe a label on the moistened edge of the package.

The next following clamp and pusher 39 may then engage the limit switch 561, deenergizing the solenoid 557, to accommodate the spring 556 to return the moistener roll 540 to its original position to moisten the next succeeding ream, and to energize the solenoid controlling the admission of fluid under pressure to the head end of the cylinder 591, to return the labeler to its original position away from the side of the table 12. The next succeeding ream being wrapped may then push the packaged and labeled ream from the table 12 onto a conveyor (not shown) or other suitable package handling means or station.

It will be understood that various modifications and variations of the present invention may be effected without departing from the spirit and scope of the novel concepts thereof.

We claim as our invention:

1. In a wrapping machine for reams of paper, a table having a wrapper receiving slot extending thereacross, means feeding and guiding a wrapper from above the top of said table vertically through said slot, means shearing the wrapper to package wrapping length, means gripping the ream and pushing the same along the table to pick up the wrapper, a conveyor having gripping means thereon facing the wrapper and ream for grippingly engaging the advance end of the ream pushed thereinto by said pushing means and forming a wrapper to the advance end of the ream and advancing the ream along the table, a glue roller mounted above said table and extending transversely thereof, means rotatably driving said glue roller, means supplying glue to said roller, and a plurality of trailing end folding arms pivotally mounted beneath said table and movable upwardly through the top thereof into engagement with the trailing end of the wrapper and folding the wrapper upwardly over the trailing end of the ream and contacting the end of the wrapper with said glue roll, and engaging the glued end of the wrapper with the portion thereof lying along the top of the ream.

2. In a ream wrapping machine, a table having a wrapper receiving slot extending transversely thereof, power means for feeding a wrapper vertically from above the top of said table, other means guiding the wrapper into said slot, means shearing the wrapper to package wrapping length, means gripping the trailing end of the ream and pushing the ream along said table to pick up a wrapper in said guide means, other means gripping the wrapper and advance end of the ream and forming the wrapper therearound and advancing the ream along said table, a glue roller extending transversely across the top of said table in vertically spaced relation with respect thereto, means rotatably driving said roller, means supplying glue to said roller, and a plurality of end folding arms pivotally mounted beneath said table and movable upwardly through the top thereof into engagement with the trailing end portion of the wrapper and folding the wrapper upwardly over the trailing end of the ream and over the top thereof and contacting the wrapper with said glue roll during the folding operation thereof, and a pressure plate engageable with the wrapper and holding the wrapper down over the previously folded leading edge thereof and setting the glued seam.

3. In a wrapping machine, a frame having a table extending therealong, paper feed rolls spaced vertically from said table, a paper guide chute leading from said rolls to a position adjacent but spaced above said table, said table having a wrapper receiving slot extending thereacross in alignment with said paper guide chute, a carriage guided for movement along said frame beneath the table, a pusher bar carried thereby for movement along the top of said table, means moving said carriage and pusher bar toward and from said guide chute, a swingable hold-down plate transversely pivoted on said frame above the path of travel of a ream along said table for engagement with the top sheet thereof by gravity, a control leg depending from said hold-down and connected thereto for bodily movement therewith, an abutment on said carriage engaged by said control leg and accommodating movement of said hold-down into engagement with the ream upon movement of said carriage toward said guide, said abutment also returning said hold-down to an elevated position upon return movement of said carriage.

4. In a ream wrapping machine, a frame having a single level table extending therealong, paper feed rolls spaced vertically from said table, a paper guide chute leading from said rolls to a position adjacent but spaced above the top of said table, said table having a wrapper receiving slot extending thereacross, a carriage guided beneath the top of said table for movement therealong, a pusher bar carried by said carriage for movement along the top of said table, means reciprocably moving said carriage along said table, a swingable hold-down plate transversely pivoted above the path of travel of the ream along said table adjacent said guide chute for engagement with the top of the ream by gravity, means controlling movement of said hold-down and accommodating said hold-down to move by gravity into engagement with the top sheet of the ream comprising a control leg depending from said hold-down and mounted for bodily movement therewith, an abutment on said carriage abuttingly engaged by said control leg and accommodating said hold-down to engage the ream by gravity upon movement of said abutment in one direction and engaging said leg to positively move said hold-down out of engagement with the ream upon movement of said abutment in an opposite direction, and a cam extending along said carriage and spaced from said abutment and extending toward the entering end of said table in position to engage said leg and positively press said hold-down into engagement with the ream during the picking up of the wrapper by said ream.

5. In a ream wrapper, a frame having a table extending therealong, paper feed rolls spaced vertically from said table, a paper guide chute leading vertically from the nip between said rolls to a position adjacent but spaced above the top of said table, said table having a wrapper receiving slot extending thereacross and a paper guide chute leading therefrom, a carriage guided for movement beneath said table, said carriage having pusher arms extending upwardly through the top of said table and slidably movable therealong, a pusher bar carried by said pusher arms for engagement with the trailing end of a ream to be wrapped, a gripper bar carried by said pusher arms for engagement with the beam during operation of said pusher, a swingable hold-down plate transversely pivoted above the ream for engagement with the top sheet thereof, means accommodating said hold-down to move by gravity into engagement with the top sheet of the ream comprising a control leg depending from said hold-down, and an abutment member on said carriage engaging said control leg.

6. In a wrapping machine for reams of paper of folio size, a frame having a table extending therealong, paper feed rolls spaced vertically from said table, a paper guide chute leading from the nip between said rolls downwardly to a position adjacent but spaced above the top of said table, said table having a wrapper receiving slot extending thereacross and a paper guide chute leading downwardly therefrom, a pusher movable along said table toward said guide chute and having gripping means thereon operable to grip the ream upon movement of said pusher toward said paper guide chute, a swingable hold-down plate transversely pivoted above the ream for engagement with the top thereof by grivity, means accommodating said hold-down plate to move by gravity into engagement with the top sheet of the ream controlled by movement of said pusher toward said chute and for positively releasing said hold-down upon return movement of said pusher, a conveyor leading from said chute along said table to a position adjacent the discharge end thereof, said conveyor having vertically spaced gripper bars facing said pusher, to receive and grip a ream pushed thereinto by said pusher and to form the wrapper around the leading end of the ream and pull the ream to a next succeeding wrapping station, means adjacent said guide chute for releasing said gripping bars to grip the ream pushed thereinto by said pusher, and other means releasing said gripper bars from the ream at the second wrapping station to afford a dwell in the travel of the ream during wrapping of the trailing end thereof.

7. A wrapping machine for reams of paper comprising a frame having a substantially single level table extending therealong, means feeding a wrapper vertically from above the top of said table, said table having a transverse slot extending therealong to receive the vertically fed wrapper, means shearing the wrapper to package wrapping length, means gripping a ream and pushing the ream along said table to pick up a wrapper in said slot, other means gripping the advance end of the wrapper and ream and forming the wrapper about the advance end of the ream advancing the ream along the table, means releasing said second gripping means, a transverse rock shaft pivotally mounted on said frame beneath said table, power means for rocking said shaft, a plurality of folding arms on said shaft, slots extending along the top of said table to receive said arms, yieldable presser members on the ends of said arms engageable with the trailing end of the wrapper and folding the wrapper over trailing edge of the ream and then pressing the same into engagement with the top of the ream upon upward pivotal movement of said arms.

8. In a wrapping machine particularly adapted to wrap reams of paper of folio size, a frame having a single level table extending therealong, said table having a wrapper receiving slot extending thereacross and means guiding a paper wrapper to and from said slot, a pusher movable along said table pushing a ream to pick up the wrapper in the said slot, a conveyer leading from said slot and extending along said table to a position adjacent the discharge end thereof, folding arms in advance of said slot, spaced beyond the receiving end of said conveyor and pivotally mounted beneath said table and movable upwardly through said table into engagement with the wrapper to form the wrapper about the trailing end of said ream, said conveyor having a plurality of spaced pulling and pushing members thereon, each having gripping means facing said pusher to be engaged with the partly wrapped leading end of the ream by said pusher, a cam holding one of said gripping means out of position to engage the ream, a second cam for operating said first cam, a rocking arm engageable with said second cam and operatively connected with said first cam to release the same and effect engagement of said gripping means, with a wrapper and ream to form the wrapper about the leading end of said ream and pull the same along said table, a third cam spaced from said second cam and engageable with said rocking arm for releasing said gripping means from the ream, and a pressure pad in advance of said folding arms and operable in timed relation therewith for pressing the wrapper in engagement with the ream.

9. A wrapping machine particularly adapted to wrap reams of paper of folio size comprising a frame having a substantially single level table extending therealong, said table having a transverse wrapper receiving slot therein in advance of the receiving end thereof, means feeding and guiding a wrapper from above the top of said table vertically through said slot, a shearing knife mounted above the top of the table, means operating said knife to shear the wrapper to package wrapping length, a pusher having gripping means thereon, power means operating said pusher to grip the ream and push the same to pick up a wrapper in said slot, a conveyor extending along the table from said slot and having clamping bars thereon facing said pusher, cam means operating said bars to engage a partially wrapped ream pushed thereinto by said pusher means to grip the same and advance the ream along said table, other cam means releasing said clamping bars, a glue roller extending transversely across said table in advance of said slot and spaced vertically thereabove, means supplying glue to said roller and other means rotatably driving the same, a transverse rock shaft pivoted beneath the top of said table, power means for rocking said shaft, a plurality of folding arms on said shaft of a generally scythe-like form in side elevation, slots in said table accommodating upward movement of said arms into engagement with the trailing end of the wrapper, and yieldable presser members on the leading ends of said arms and extending therealong for engagement with the trailing end of the wrapper and swinging the wrapper up into contact with said glue roller to apply glue thereto, and then over the trailing end of the ream into engagement with the leading end portion of the wrapper folded thereover.

10. A wrapping machine particularly adapted to wrap reams of paper of folio size comprising a frame having a substantially single level table extending therealong, said table having a transverse wrapper receiving slot therein, in advance of the receiving end thereof, means feeding and guiding a wrapper from above the top of said table vertically through said slot, a shearing knife mounted above the top of the table, means operating said knife to shear the wrapper in package wrapping length, a pusher having gripping means thereon, power means operating said pusher to grip the ream and push the same to pick up a wrapper in said slot, a conveyor extending along the table from said slot and having clamping bars thereon facing said pusher, cam means operating said bars to engage a partially wrapped ream pushed thereinto by said pusher means to grip the same and advance the ream along said table, other cam means releasing said clamping bars, a glue roller extending transversely across said table in advance of said slot and spaced vertically thereabove, means supplying glue to said roller and other means rotatably driving the same, a transverse rock shaft pivoted beneath the top of said table, power means for rocking said shaft, a plurality of folding arms on said shaft of a generally scythe-like form in side elevation, slots in said table accommodating upward movement of said arms into engagement with the wrapper, yieldable presser members on the leading ends of said arms and extending therealong for engagement with the wrapper and swinging the wrapper up into contact with said glue roller to apply glue thereto, and then over the trailing end of the ream into engagement with the wrapper folded thereover, and a pressure pad extending across the top of said table and mounted thereabove for vertical movement into engagement with the glued seam of the wrapper and pressing the same to set the glue.

11. A wrapping machine particularly adapted to wrap reams of paper of folio size comprising a frame having a substantially single level table extending therealong, said table having a transverse wrapper receiving slot therein, in advance of the receiving end thereof, means feeding and guiding a wrapper from above the top of said table vertically through said slot, a shearing knife mounted above the top of the table, means operating said knife to shear the wrapper in package wrapping length, a pusher having gripping means thereon, power means operating said pusher to grip the ream and push the same to pick up a wrapper in said slot, a conveyor extending along the table from said slot and having clamping bars thereon facing said pusher, cam means operating said bars to engage a partially wrapped ream pushed thereinto by said pusher means to grip the same and advance the ream along said table, other cam means releasing said clamping bars, a glue roller extending transversely across said table in advance of said slot and spaced vertically thereabove, means supplying glue to said roller and other means rotatably driving the same, a transverse rock shaft pivoted beneath the top of said table, power means for rocking said shaft, a plurality of folding arms on said shaft of a generally scythe-like form in side elevation, slots in said table accommodating upward movement of said arms into engagement with the wrapper, yieldable presser members on the leading ends of said arms and extending therealong for engagement with the wrapper and swinging the wrapper up into contact with said glue roller to apply glue thereto, and then over the ream into engagement with portion of the wrapper folded thereover, a pressure pad extending across the top of said table in advance of said glue roller and mounted in vertically spaced relation with respect thereto, means operable in timed relation with respect to operation of said folding arms for engaging said pressure pad with the glued seam of the wrapper, and a heating element extending along said pressure pad for setting the glue by heat.

12. A wrapping machine particularly adapted to wrap reams of paper of folio size comprising a table having a wrapper receiving slot extending thereacross in advance of the entering end thereof, means for feeding and guiding a wrapper from above the top of said table vertically through said slot beneath the bottom thereof, means shearing the wrapper to package wrapping length, means gripping a ream and pushing the ream along the table to pick up the wrapper in said slot and initially form the wrapper around the advance end thereof, other means gripping the advance end of the ream and the wrapper picked up thereby and forming a wrapper around the advance end of the ream and advancing the ream along said table, a glue roller rotatably mounted above and extending transversely of said table in advance of said slot, means rotatably driving said roller, other means supplying glue thereto, a transverse rock shaft pivoted beneath said table, power means for rocking said shaft, a plurality of folding arms on said shaft of a generally scythe-like form in side elevation, slots in said table to accommodate upward movement of said arms therethrough into engagement with the wrapper to fold the wrapper up into wiping engagement with said glue roller and over the trailing end of the ream into engagement with the portion of the wrapper folded thereover, a smoothing roller supported above the top of said table positioned to have smoothing engagement with the wrapper extending along the top of the ream from the advance end thereof during travel of the ream, a pressure pad positioned between said smoothing roller and folding arms and supported above the top of said table and guided for vertical movement toward and from the ream, power means operable in timed relation with respect to movement of said folding arms for engaging said pressure pad with the glued seam of the wrapper, and a heating element extending along said pressure pad for sealing the glued seam by heat.

13. A wrapping machine particularly adapted to wrap reams of paper of folio size comprising a frame having a table extending therealong on a substantially single level, a slot extending transversely of said table in advance of the entering end thereof, means feeding and guiding a wrapper from above the top of said table vertically through said slot, means shearing the wrapper to package wrapping length, means gripping a ream and pushing the ream along said table to pick up the wrapper at said slot and initially forming the wrapper around the advance end of the ream, other means receiving the partially wrapped ream, gripping the wrapper and ream at the advance end thereof and forming the wrapper thereabout and advancing the partially wrapped ream along said table, a transverse rock shaft pivoted beneath said table, power means for rocking said shaft, a plurality of folding arms on said shaft, spaced slots extending along the top of said table to accommodate said arms to move upwardly through the top thereof, yieldable presser members on said arms engageable with the trailing end of the wrapper and folding the wrapper up over the trailing edge of the ream and then downwardly over the top of the ream, a plurality of spaced smoothing and retaining fingers spaced in advance of said folding arms and rockingly mounted beneath the top of the table and movable from a position beneath the top of the table upwardly through said slots into engagement with the wrapper folded over the trailing end of the ream and smoothing the wrapper thereover and holding the wrapper in engagement with the trailing end of the ream during the completion of the wrapping operation thereof.

14. A wrapping machine particularly adapted to wrap reams of paper of folio size comprising a frame having a table extending therealong, said table having a paper receiving slot extending transversely thereof in advance of the entering end of said table, means feeding and guiding the wrapper from above the top of said table downwardly through said slot, means shearing the wrapper to package wrapping length, means gripping the trailing edge of a ream and pushing the same along said table into engagement with the wrapper extending through said slot, other means receiving the advance end of the wrapper and ream and gripping and forming the wrapper about said advance end of the ream, a transverse rock shaft pivoted beneath the top of said table, power means for rocking said shaft, a plurality of folding arms on said shaft, slots extending along said table to accommodate said arms to pass upwardly through the top thereof into folding engagement with the trailing end of the wrapper, a second rock shaft pivoted beneath the top of said table in parallel relation with respect to said first shaft, a separate crank on each of said rock shafts, links connecting said cranks together, rocking said second shaft in timed relation with respect to said first shaft, and a plurality of spaced smoothing fingers movable upwardly through said slots and mounted on said second rock shaft to engage the trailing end of the wrapped ream and maintain the wrapper in engagement therewith.

15. In a wrapping machine particularly adapted to wrap reams of paper of folio size, a frame, a table extending along said frame, feed rolls spaced above said table, a guide chute leading from said rolls to said table, a second guide chute leading from said table beneath the top thereof for guiding a wrapper fed by said feed rolls to lie in a vertical plane above and beneath the top of said table, a shearing knife spaced beneath said feed rolls, power means for operating said knife, a pusher reciprocably mounted on said table at the entering end thereof, power means for operating said pusher, a conveyor in advance of said guide chutes and having clamping bars thereon for clampingly engaging the advance end of a partially wrapped ream pushed thereinto by said pusher and forming the wrapper around the end of said ream and drawing the partially wrapped ream along said table, a glue roller mounted on said frame above the path of travel of the ream therealong and extending transversely of said table, means rotatably driving said roller, other means supplying glue to said roller, a transverse rock shaft pivotally mounted beneath said table, a power operated member for rocking said shaft, a plurality of folding arms on said shaft having upwardly projecting engaging end portions having yieldable presser members secured thereto and extending therealong, spaced slots in said table extending longitudinally thereof to accommodate upward movement of said arms through said slots into engagement with the wrapper to move the wrapper upwardly into wiping engagement with said glue roller and then downwardly in engagement with the top of the ream and the portion of the wrapper lying over said ream, a second transverse shaft rockingly mounted beneath said table in parallel relation with respect to said first shaft, crank and link means connecting said shafts together to rock said second shaft upon rocking movement of said first shaft, and a plurality of smoothing and retaining fingers mounted on said second rock shaft and movable therewith into holding engagement with the wrapper folded over the trailing end of the ream, for holding the wrapper in tight engagement therewith.

16. In a wrapping machine particularly adapted to wrap reams of paper of folio size, a frame, a table extending along said frame, feed rolls spaced above said table, a guide chute leading from said rolls to said table, a second guide chute leading from said table beneath the top thereof for guiding a wrapper fed by said feed rolls to lie in a vertical plane above and beneath the top of said table, a shearing knife spaced beneath said feed rolls, power means for operating said knife, a pusher reciprocably mounted on said table at the entering end thereof, power means for operating said pusher, a conveyor in advance of said guide chutes and having clamping bars thereon for clampingly engaging the advance end of a partially wrapped ream pushed thereinto by said pusher and forming the wrapper around the end of said ream and drawing the partially wrapped ream along said table, a glue roller mounted on said frame above the path of travel of the ream therealong and extending transversely of said table, means rotatably driving said roller, other means supplying glue to said roller, a transverse rock shaft pivotally mounted beneath said table, a power operated member for rocking said shaft, a plurality of folding arms on said shaft having upwardly projecting engaging end portions having yieldable presser members secured thereto and extending therealong, spaced slots in said table extending longitudinally thereof to accommodate upward movement of said arms through said slots into engagement with the wrapper to move the wrapper upwardly into wiping engagement with said glue roller and then downwardly in engagement with the top of the ream and the portion of the wrapper lying over said ream, a second transverse shaft rockingly mounted beneath said table in parallel relation with respect to said first shaft, crank and link means connecting said shafts together to rock said second shaft upon rocking movement of said first shaft, a plurality of smoothing and retaining fingers mounted on said second rock shaft and movable therewith into holding engagement with the wrapper folded over the trailing end of the ream for holding the wrapper in tight engagement therewith, a pressure pad spaced above the path of travel of the ream along said table in advance of said end folding arms and guided for vertical movement toward and from the ream, a power operated member for engaging said pressure pad with the folded wrapper along the glued edge thereof and holding the ends of the wrapper together, and a heating element extending along said pressure pad for sealing the glued seam by heat.

17. In a wrapping machine particularly adapted to wrap reams of paper of folio size, a frame having a substantially single level table extending therealong, said table having a wrapper receiving slot extending transversely thereof, means supplying a wrapper to said table and slot and holding the wrapper above and below the top of said table, a pusher feeding a ream into said wrapper, a clamping and pushing conveyor receiving and engaging the partially wrapped ream and conveying the same along said table, means for wrapping the wrapper about the trailing end of the ream, comprising a plurality of spaced end folding arms mounted beneath the top of said table, a transverse shaft rockingly moving said arms, a power member rocking said shaft, said arms having upwardly projecting engaging end portions having yieldable presser members secured to the end thereof and extending downwardly along said arms to engage the bottom of the wrapper and yieldably engage the wrapper with the top of the ream, a second rock shaft pivotally mounted beneath said table in parallel relation with respect to said first rock shaft, a crank on said shaft, a yieldable crank and link connection from said first rock shaft to said crank, rocking said second rock shaft in timed relation with respect to said first rock shaft, and a plurality of holding fingers on said second rock shaft moved thereby from a position beneath the top of said table upwardly through said slots into yieldable angagement with the wrapped trailing end of the ream.

18. In a wrapping machine particularly adapted to wrap reams of paper of folio size, a frame having a single level table extending therealong for substantially the length thereof, a transverse slot in said table, means supplying a wrapper to said slot and holding the wrapper across said table above and below the top thereof, a pusher feeding a ream into said wrapper, a gripping and pushing conveyor for receiving and gripping the partially wrapped ream and pulling the same along said table, a transverse rock shaft pivotally mounted in said frame beneath said table, a power member for rocking said shaft in reverse directions, a plurality of folding arms on said shaft of a generally scythe-like form in side elevation for folding the wrapper along the trailing end of the ream, slots in said table accommodating upward movement of said arms therethrough, a glue roller extending transversely of said table and spaced thereabove, said glue roller being so located with respect to said folding arms as to be contacted by the inner edge of the trailing end of the wrapper during upward folding movement of said folding arms, a second rock shaft pivotally mounted beneath said table, cranks on said rock shafts, a yieldable linkage connection connecting said shaft together to pivot said second rock shaft with said first rock shaft with a delayed upward movement, a plurality of smoothing and retaining fingers on said second rock shaft engaging the wrapper with the trailing end of the ream, a pressure pad spaced vertically from said table in advance of said glue roller and folding arms, means guiding said pressure pad for vertical movement into engagement with the wrapper on the ream, other means moving said pressure pad toward and from the ream, and a heating element extending along said pressure pad to seal the glued seam by heat.

19. In an apparatus of the class described, a frame having a table extending therealong upon which a series of wrapping operations may be effected upon travel of the ream in a single plane, conveying means clampingly engaging a ream and drawing the same along said table for a portion of the length thereof and then releasing the ream to effect a dwell in the travel thereof along said table and pushing the ream for the balance of the length of said table, comprising two spaced endless chains guided for movement in vertically disposed orbital paths along opposite sides of said table, spaced grippers on said chains and moved along said table thereby, each gripper including a support structure secured between said chains having a lower clamping bar carried thereby for movement along the top of said table and facing toward the entering end of said table and also having a vertically aligned upper clamping bar mounted on said support structure for movement toward and from said lower bar, a cam and crank on said support structure for moving said upper clamping bar away from said lower clamping bar, spaced cams on said frame engaging said crank and operating the same to open said clamping bars, a spring connected between said bars to move the same into clamping engagement with the leading end of the ream upon release of said crank from the advance of said cams, and said support structure having a pusher plate extending therealong and facing oppositely from said clamping bars for abutting engagement with the trailing end of a ream and pushing the same through a series of succeeding wrapping stations.

20. In a machine for wrapping reams of paper of folio size, a frame having a substantially single level table extending therealong, said table having a wrapper receiving slot extending thereacross adjacent the entering end thereof, means supplying a wrapper to said slot and holding the wrapper above and below the top of said table, means pushing the ream to pick up the wrapper in said slot and initially form the wrapper around the advance end of the ream, conveyor means having clamping bars thereon engageable with the leading end of the partially wrapped ream and completing the forming of the wrapper around the leading end of the ream and drawing the ream along said table, a plurality of spaced folding arms movable from beneath the top of said table upwardly into engagement with the trailing end of the wrapper and engaging the same with the top of the ream, a transverse glue roller, said glue roller extending across the table and spaced thereabove into position to be contacted by the trailing end of the wrapper during folding movement thereof by said folding arms, a pressure plate spaced in advance of said glue roller and end folding arms and movable into engagement with the glued overlapping end of the wrapper for sealing the glued seam, means tucking the overlapping forward ends of the wrapper inwardly along opposite sides of the ream during upward movement of said folding arms comprising two reciprocably movable tucking arms mounted for movement about vertical axes spaced laterally from the path of travel of the ream along said table, means moving said tucking arms toward the wrapper during travel thereof for tucking the trailing end thereof, said means also moving said tucking arms in an opposite direction at the completion of the wrapping of the trailing end thereof for tucking the trailing overhanging ends of the wrapper inwardly along the sides of said ream, spaced folding plows in advance of said tucking arms, said plows having downwardly inclined wrapper engaging surfaces engageable with the upper overlapping flaps of the wrapper and tucking the flaps downwardly along the sides of the ream, a glue roller adjacent each of said plows applying glue to the lower upwardly facing flap of the wrapper and second spaced folding plows in advance of said first mentioned plows and having upwardly inclined folding faces engaging the lower flaps of the wrapper and folding the same upwardly into engagement with the downwardly folded upper flaps thereof, and pressure plates in advance of said last mentioned folding plows engageable with the sides of the wrapper and having heating elements therein setting the glued overlapping flaps by heat.

21. A machine for wrapping reams of paper comprising a frame, a table extending along said frame at substantially a single level, a guide chute guiding a wrapper vertically to said table, another guide chute guiding the wrapper vertically beneath the top of said table, means pushing a ream along said table in the space between said guide chutes to pick up a wrapper therebetween, a conveyor extending from said guide chutes along said table and having gripping and pushing means operable to receive the leading end of the partially wrapped ream from said pushing means and form the wrapper thereabout and pull the same along said table, and a swingable hold-down plate pivoted on the upper of said guide chutes above the path of travel of the ream along said table and swingably suspended from said chute to engage the top sheet of the ream and hold the ream down during pushing movement thereof into the wrapper and to initially form the wrapper to the upper edge of the ream, a leg depending from said hold-down shoe and rigidly secured thereto and having engagement with said pusher for movement therewith to accommodate said hold-down shoe to move into engagement with the top sheet of the ream by gravity during the pushing operation of said pusher and returning said hold-down shoe upon return movement of said pusher.

22. In a ream wrapping machine of the class described, a frame, a table extending along said frame on substantially a single level and having a slot extending transversely thereof adjacent the entering end of said table, means feeding and guiding a paper wrapper to said slot and maintaining the wrapper in a vertically extending position above and below the top of said table, a pusher having a gripper thereon engageable with the ream and gripping the same and pushing the ream into the wrapper extending across the table, a conveyor in advance of said slot and having clamping bars thereon for receiving the partially wrapped ream pushed thereinto by said pusher and clamping the same and pulling the same along said table, a glue roller extending across said table in vertically spaced relation with respect thereto in advance of said slot, folding arms movable from beneath said table into engagement with the trailing end of the wrapper for contacting the wrapper with said glue roller and wrapping the same over the trailing end and top of the ream, a pressure pad engaging the glued trailing end of the wrapper with the leading end thereof extending along the top of said ream and pressing the same to seal the glue, two laterally spaced tucking brushes reciprocably movable along the table, tucking first the leading overhanging ends of the wrapper along the ends of the ream during end folding thereof and then tucking the trailing overhanging ends of the wrapper along the ends of the ream after the end folding and gluing thereof, folding plows in advance of said tucking brushes engageable with the overlapping flaps of the wrapper for folding the same downwardly along the edges of the ream, glue rollers adjacent but spaced outwardly of said folding plows engaging the upwardly facing lower overlapping flaps of the wrapper for applying glue thereto, other folding plows in alignment with said first mentioned folding plows and in advance thereof, engaging the lower flaps of the wrapper and folding the same upwardly into engagement with the upper flaps thereof, pressure plates in advance of said folding plows having heating elements extending therealong for setting the glued ends of the wrapper, a moistener roll adjacent one side of said table in advance of said presser plates, means biasing said moistener roll in position to engage and moisten the folded and glued side of the wrapped ream passing thereby, a labeler in advance of said moistener roll movably mounted along one side of said table for engagement with the ream passing thereby, means operable to move said labeler into engagement with an end of the ream, and a solenoid operatively connected with said moistener roller and operable upon movement of said labeler inwardly toward the ream to retract said moistener roll from the ream.

23. In a ream wrapping machine, a table having a wrapper receiving slot in the top thereof, means for feeding and guiding a wrapper from above said table through said slot, a pusher for pushing the ream to pick up the wrapper in said slot, means gripping the leading end of the wrapper and ream and forming the wrapper to the leading end thereof, said means also pulling the ream along said table for a portion of the length thereof, means folding the wrapper over the trailing end of the ream to overlap the leading end of the wrapper and gluing the overlapping ends of the wrapper together, means tucking the projecting and forward trailing ends of the wrapper along the sides of the ream, and aligned and spaced first and second folding plows on each side of said table for folding the projecting upper and lower flaps of the wrapper downwardly and upwardly along the sides of the ream during movement therealong, the first of said plows having an inclined folding surface facing the ream and extending downwardly from a position above the ream and terminating in spaced relation with respect to said table, and also flaring outwardly and downwardly from the margins of said folding surface and deflecting a misaligned ream inwardly in the space between said plows, a creasing shoe extending outwardly from each of the first of said folding plows and engaging the lower flap of the wrapper for creasing the same as it passes thereby, and the second of said folding plows each having upwardly inclined folding surfaces engaging the lower flaps of the wrapper and folding the same into engagement with the downwardly folded upper flaps of the wrapper.

24. In a ream wrapping machine, a table having a wrapper receiving slot in the top thereof, means for feeding and guiding a wrapper from above said table through said slot, a pusher for pushing the ream to pick up the wrapper in said slot, means gripping the leading end of the wrapper and ream and forming the wrapper to the leading end thereof, said means also pulling the ream along said table for a portion of the length thereof, means folding the wrapper over the trailing end of the ream to overlap the leading end of the wrapper and gluing the overlapping ends of the wrapper together, means tucking the ends of the wrapper along the sides of the ream, and aligned and spaced first and second folding plows on each side of said table for folding the projecting upper and lower flaps of the wrapper downwardly and upwardly along the sides of the ream during movement therealong, the first of said plows having an inclined folding surface facing the ream and extending downwardly from a position above the ream and terminating in spaced relation with respect to said table, and also flaring outwardly and downwardly from the margins of said folding surface and deflecting a misaligned ream inwardly in the space between said plows, a creasing shoe extending outwardly from each of the first of said folding plows and engaging the lower flap of the wrapper for creasing the same as it passes thereby, a glue box on the outside of each of the first of said folding plows and having a glue roller movable therein, positioned in advance of said creasing shoe for engagement with the creased upper face of the lower flap of the wrapper, and the second of said folding plows each having inclined folding surfaces inclined upwardly from the top of said table for folding the glued lower flaps upwardly into engagement with the upper flaps of the wrapper.

25. In a ream wrapping machine, a table, means progressing a ream along said table and folding a wrapper to the leading end of the ream, other means folding the wrapper around the trailing end of the ream, and means tucking the projecting ends of the wrapper along opposite sides of the ream comprising two arms mounted for reciprocable movement about vertical axes spaced laterally from opposite sides of said ream and having tucking brushes on the free ends thereof engageable with the projecting end portions of the wrapper during movement thereby, means engaging the upper projecting portion of the wrapper and holding the same down during tucking thereof, separate reciprocably movable drive members for each of said brushes controlled by travel of the ream along said table, to first move said arms and brushes toward the leading end of the ream to tuck the front projecting portions of the wrapper along the sides of the ream and to then move said arms and brushes toward the trailing end of the ream upon further advance of the ream along the table, to tuck the rear projecting portions of the wrapper along the sides of the ream.

26. In a ream wrapping machine, a table, means progressing a ream along said table and folding a wrapper around the leading and trailing ends thereof, means tucking the projecting forward and rear portions of the wrapper along opposite sides of the ream comprising two tucking members reciprocably movable about vertical axes spaced laterally from opposite sides of the ream, and oscillating drive socket at one side of the ream, having one of said tucking members insertable therein for reciprocably driving the same, and a plurality of laterally spaced oscillating drive sockets at the opposite side of the ream, each of said sockets affording a means for reciprocably driving the other of said tucking members in accordance with the width of the ream being wrapped.

27. In a wrapping machine for reams of paper, a frame having a table extending therealong, feed rolls for the paper wrapper spaced above the top of said table, a slot extending across the top of said table in alignment with the nip between said feed rolls, a paper guide chute leading from said feed rolls to said slot, a pusher movable along said table for pushing a ream therealong to pick up a wrapper in said chute and slot, and a swingable hold-down plate adjacent said guide chute and pivoted for movement about a transverse axis disposed above the path of travel of the ream along the table, means retaining said hold-down plate in an upwardly extended position with respect to the ream and operated by operation of said pusher to move said hold-down plate into pressing engagement with the top sheet of the ream to hold the leading edges of the sheets of the ream down during advance of the ream into the wrapper.

28. In a wrapping machine, a frame having a table extending therealong, paper feed rolls spaced above said table, a paper guide chute leading from said rolls to a position adjacent but spaced above the top of said table, said table having a wrapper receiving slot extending therealong in alignment with said guide chute, a pusher movable along said table for pushing an article to be wrapped to pick up a wrapper in the space between said chute and slot, a swingable hold-down plate adjacent said chute and transversely pivoted above the path of travel of the ream along the table for engagement with the top thereof, retaining means having operative connection with said pusher and holding said hold-down plate in upwardly extending relation with respect to the top sheet of the ream and movable with said pusher upon operation thereof to accommodate said hold-down plate to move by gravity to extend partially along the top sheet of the ream, and other means on said pusher and engageable with said retaining means for operating said retaining means to positively engage said hold-down with the top sheet of the ream during the operation of picking up the wrapper in said chute.

References Cited in the file of this patent

UNITED STATES PATENTS

| | | |
|---|---|---|
| 1,341,184 | Leumann | May 25, 1920 |
| 1,465,977 | Faull | Aug. 28, 1923 |
| 1,646,497 | Sandberg | Oct. 25, 1927 |
| 1,965,324 | Tindal et al. | July 3, 1934 |
| 2,138,728 | Chalmers | Nov. 29, 1938 |
| 2,232,558 | Petskeyes et al. | Feb. 18, 1941 |
| 2,336,795 | Malhiot | Dec. 14, 1943 |
| 2,367,160 | Werden | Jan. 9, 1945 |
| 2,609,646 | Total | Sept. 9, 1952 |